(12) United States Patent  (10) Patent No.: US 8,533,107 B2
Bell et al.  (45) Date of Patent: Sep. 10, 2013

(54) RETURNS-TIMING FOR MULTIPLE MARKET FACTOR RISK MODELS

(75) Inventors: Simon Wannasin Bell, Hove (GB); Stefan Hans Schmieta, Marietta, GA (US); Frank Pak-Ho Siu, Hong Kong (CN)

(73) Assignee: Axioma, Inc., New York, NY (US)

( * ) Notice: Subject to any disclaimer, the term of this patent is extended or adjusted under 35 U.S.C. 154(b) by 0 days.

(21) Appl. No.: 13/503,696

(22) PCT Filed: May 19, 2011

(86) PCT No.: PCT/US2011/037229
§ 371 (c)(1), (2), (4) Date: Apr. 24, 2012

(87) PCT Pub. No.: WO2012/044373
PCT Pub. Date: Apr. 5, 2012

(65) Prior Publication Data
US 2013/0080310 A1  Mar. 28, 2013

Related U.S. Application Data

(60) Provisional application No. 61/404,103, filed on Sep. 27, 2010.

(51) Int. Cl.
*G06Q 40/00* (2012.01)

(52) U.S. Cl.
USPC .......................................... 705/37

(58) Field of Classification Search
None
See application file for complete search history.

(56) References Cited

U.S. PATENT DOCUMENTS

2004/0078319 A1* 4/2004 Madhavan et al. ............. 705/38
2007/0078746 A1* 4/2007 Ciampi et al. ............. 705/36 R

* cited by examiner

*Primary Examiner* — Rajesh Khattar
(74) *Attorney, Agent, or Firm* — Law Offices of Peter H. Priest, PLLC

(57) ABSTRACT

Until recently, risk models have been built using low frequency data, such as weekly or monthly data. This approach has resulted in a necessary compromise between model stability for which one needs a long history of data, and model responsiveness, for which, the shorter the history, the better. Stability plus responsiveness can be achieved if one uses daily data, which allows for a large number of observations to be used in model estimation without using long out-of-date data. Daily data have other problems, however, as the differing closing times of markets worldwide may induce spurious relationships across model factors. In particular, correlations between markets may appear lower than they truly are due to a market lag effect. To address such issues, a stable, daily data-based factor risk model is described which takes account of the differing market closing times and corrects the model factor correlations and specific returns accordingly.

18 Claims, 18 Drawing Sheets

CORRELATIONS WITH THE US MARKET 2000-2009.

CORRELATIONS WITH THE US MARKET 2000-2009.

CORRELATIONS WITH THE US MARKET 2000-2009.

CORRELATIONS WITH THE US MARKET 2000-2009.

AVERAGE SQUARE T-STATISTICS OF THE N COEFFICIENTS

AVERAGE SQUARE T-STATISTICS OF THE N U.S. MARKET COEFFICIENTS

CORRELATIONS BETWEEN THE US AND OTHER MARKET RETURNS 2000-2009.

ROLLING CORRELATIONS BETWEEN AUS AND US

ROLLING CORRELATIONS BETWEEN AUS AND US

CORRELATIONS WITH THE US MARKET 2000-2009.

CORRELATIONS WITH THE GLOBAL MARKET FACTOR RETURN 2000-2009.

CUMULATIVE RETURNS WITH AND WITHOUT RETURNS-TIMING ADJUSTMENT

CUMULATIVE RETURNS WITH AND WITHOUT RETURNS-TIMING ADJUSTMENT

WEEKLY BENCHMARK VOLATILITY. A BENCHMARK OF APPROXIMATELY 500 EUROPEAN STOCKS VS. A BENCHMARK OF APPROXIMATELY 3000 GLOBAL STOCKS.

WEEKLY BENCHMARK VOLATILITY. A BENCHMARK OF APPROXIMATELY 3000 ASIAN AND PACIFIC REGION STOCKS VS. A BENCHMARK OF APPROXIMATELY 3000 GLOBAL STOCKS.

WEEKLY BENCHMARK VOLATILITY. A BENCHMARK OF APPROXIMATELY 3000 ASIAN AND PACIFIC REGION STOCKS VS. A BENCHMARK OF APPROXIMATELY 3000 GLOBAL STOCKS.

ADR SPECIFIC RETURN CORRELATION FOR THE EM MODEL WITH AND WITHOUT THE ADR CORRECTION.

ADR SPECIFIC RETURN CORRELATION FOR THE EU MODEL WITH AND WITHOUT THE ADR CORRECTION.

RETURNS-TIMING FOR MULTIPLE MARKET FACTOR RISK MODELS

The present invention claims the benefit of U.S. Provisional Ser. No. 61/404,103 filed Sep. 27, 2010, which is incorporated by reference herein in its entirety.

FIELD OF INVENTION

The present invention relates generally to the estimation of the risk, or active risk, of an investment portfolio using factor risk models. More particularly, it relates to improved computer-based systems, methods and software for more accurate estimation of the risk or active risk of an investment portfolio whose individual assets or whose underlying assets are traded on markets whose hours of trading are different. The invention disclosed enables a factor risk model's factor returns to be adjusted via a vector auto-regressive (VAR) model of local market returns to correct for and compensate for the effect of assets trading at non-uniform or partially overlapping and non-overlapping times. This correction adjusts correlations across markets resulting in a more realistic factor risk model. The same adjustment may be used to correct the specific (idiosyncratic) returns of American depository receipts (ADRs) and similar instruments to remove the errors caused by different trading hours between the ADR and its underlying stocks. This, in turn, allows the specific risk of the ADR to track more closely that of the underlying stocks.

BACKGROUND OF THE INVENTION

There are several well known mathematical modeling techniques for estimating the risk of a portfolio of financial assets such as securities. The current state of the art involves computing a factor risk model for a universe of potential investments. Factor risk models estimate the risk of thousands or tens of thousands or more of assets using a much smaller set of "factors" that are known to be predictive of the asset returns and volatility. See for example, R. C. Grinold, and R. N. Kahn, Active Portfolio Management: A Quantitative Approach for Providing Superior Returns and Controlling Risk, Second Edition, McGraw-Hill, New York, 2000, and R. Litterman, Modern Investment Management: An Equilibrium Approach, John Wiley and Sons, Inc., Hoboken, N.J., 2003 (Litterman), both of which are incorporated by reference herein in their entirety. These two references present the mathematical details involved in computing and specifying a complete factor risk model including a matrix of factor exposures, a matrix of factor-factor covariances, and a matrix or vector of specific covariances.

Factor risk models are commonly used by investment professionals in a variety of ways. One use of factor risk models is to use them in conjunction with an optimizer to rebalance an investment portfolio. The optimization problem solved would typically use the risk or volatility estimates of the factor risk model to limit the risk of the rebalanced portfolio or part of the rebalanced portfolio. Alternatively, the optimization problem may restrict the exposure of the rebalanced portfolio to one or more factors in the factor risk model. The uses of factor risk models with optimization tools and their potential difficulties is addressed in U.S. Pat. No. 7,698,202.

Another use of factor risk models is for ex-post performance analysis of a history of investment portfolios. Such performance attribution can be performed in a number of different well known methods. For example, the history of predicted risk and factor exposures as defined by a history of factor risk models and a history of investment portfolios is often part of a factor-based performance attribution. In this kind of analysis, the history of factor returns is important, as it is used to explain the sources of return and risk in the history of investment portfolios. Groups of factors in a factor risk model such as industries or sectors can also be used for a Brinson-style or returns-style attribution. Details involved in the expost performance analysis are given in Litterman.

Some factor risk models are constructed for a universe of potential investments that all trade at the same time. For example, most US equities trade from 9:30 AM to 4:00 PM Eastern Standard Time. A factor risk model for US equities can use the prices as of the close of the US market and avoid most issues related to asynchronous prices and returns.

However, American Depository Receipts (ADR) are tradable, equity assets that are traded on the US market but replicate a portfolio of non-US stocks. For example, a Japanese ADR trades on a US exchange but tracks the performance of a portfolio of Japanese stocks. Since the US and Japanese markets do not trade at the same time, it is possible that the asynchronous closing prices of the ADR and the underlying Japanese equities may distort the relationship between their returns.

In addition, many factor risk models cover assets that trade in more than one market. For example, a global factor risk model includes assets that are traded around the world. Such factor risk models have a need to address the potential distortion caused by asynchronously traded assets. Addressing this potential distortion would improve the performance of the factor risk model.

The issue of asynchronous prices and their potential distortion of financial computations has been studied previously.

The issue of autocorrelation between daily prices and their distortion of the estimate of the covariance of asset returns was discussed in W. K. Newey and K. D. West, "A Simple, Positive Semi-Definite, Heteroskedasticity and Autocorrelation Consistent Covariance Matrix," Econometrica, 55(3), pp. 703-708, 1987, and W. K. Newey and K. D. West, "Automatic Lag Selection in Covariance Matrix Estimation," The Review of Economic Studies, 61(4), pp. 631-653, 1994, both of which are incorporated by reference herein in their entirety. In these two papers, the authors demonstrate that market microstructure and market timing can create serial dependence in daily asset returns. For example, lead-lag relationships often occur in which an assets price is more likely to go up on a day following a price increase than on a day following a price decrease.

Newey and West propose a correction algorithm that can be applied to either a factor risk model's factor-factor covariance matrix or an asset-asset covariance matrix. This correction algorithm compensates for autocorrelation of either the factor returns or the asset returns. This correction algorithm applies to any set of covariance data which exhibits a true, bona fide autocorrelation; that is, any set of returns for which a genuine lead-lag relationship across assets or factors exists regardless of the sampling of the data. Such an autocorrelation can exist between assets and factors of a single trading market, such as the US equities market. The Newey-West algorithm does not reduce spurious autocorrelation created by returns from assets or underlying assets on markets that trade at different times. Such spurious autocorrelation is purely a result of data-sampling. In other words, the Newey West correction implicitly assumes (in the context of multi-factor risk models) that the asset returns are already aligned and corrects for their natural autocorrelation behavior. Thus, there is a need to create a method for correctly estimating the covariance of assets and factors whose asset prices and returns are asynchronously timed. Such a model will improve the covariances and correlations in any factor risk model. It is also likely to reduce the observed autocorrelation of factor returns in factor risk models. A good asynchronous timing model of asset prices and returns is likely to improve the Newey-West correction normally applied to factor risk models.

Scholes and Williams describe a modified estimation procedure for betas from asynchronous data in Scholes, M., and J. Williams, "Estimating Betas From Nonsynchronous Data", Journal of Financial Economics, 5, pp. 309-328, 1997, which is incorporated by reference herein in its entirety. This paper describes an approach to compensate the estimate for alphas and beta (the ratio of two covariance estimates) for assets that are traded asynchronously. However, the asynchronously studied is driven by the frequency at which assets are traded and is modeled as by a randomly distributed variable. In their model of asynchronous returns, the relative timing of the markets upon which the assets are traded is not considered. In fact, the principal illustrative example used is a comparison of stocks traded on the New York Stock Exchange and the American Stock Exchange, both of which trade during the same hours. By analyzing the manner in which least squares estimates are biased by returns generated by randomly traded assets, this work creates a correction algorithm for betas. However, it does not address any errors caused by known differences in the times of market trading, nor does it indicate how their approach could be utilized when creating a factor risk model.

Burns, Engle, and Mezrich propose using a vector, moving average model to improve the estimates of asset-asset covariance in "Correlations and volatilities of asynchronous data," by Patrick Burns, Robert Engle, and Joseph Mezrich, University of California at San Diego, April 1998, available at URL http://ideas.repec.org/p/cdl/ucsdec/97-30r.html, which is incorporated by reference herein in its entirety. This study does address the issue of asset returns for assets traded on markets that trade during different hours. However, this work does not show how such models may be easily utilized when estimating factor risk models. It does not discuss which components of a factor risk model—factor returns, types of factors, factor covariance, specific return, and specific risk—are affected by the model of synchronized prices. Nor does it describe efficient computational methods that can be used to incorporate the model into a factor risk model.

The invention disclosed here gives the first practical approach by which a model for correction of asynchronous returns may be simply and efficiently incorporated into the factor regression of a multi-factor risk model. Furthermore, the invention explicitly describes how depository receipts may also be modeled in a multi-factor risk model using a model of asynchronous returns.

SUMMARY OF THE INVENTION

Among its several aspects, the present invention recognizes daily asset returns are typically based on the prices when the market or exchange on which an asset trades close. However, because different equity markets do not open and close simultaneously, the use of daily returns to estimate relationships across assets trading in different time-zones offers a number of challenges. Consider Tokyo: this market closes before the US market has even opened. Thus, stocks trading in Japan will not reflect events on the US market until the Tokyo market reopens the next day. There is, therefore, the distinct possibility of a lag behavior across asset returns. For example, if one market always goes up when the other goes down, this would give the appearance of negative correlation across markets. Such a negative correlation implies that one market is a hedge for the other. In reality, this correlation is most likely an artifact of the time-delay, and the markets are positively correlated.

To illustrate this, we compute daily returns for a selection of eleven typical markets: each market return is the weighted sum of the asset returns within the market. We then compute the correlations between these markets. FIG. 1 shows the correlations between the US market and the ten other markets. The markets are arranged in rough order from East (Australia and Japan) to West (United Kingdom). The market correlations increase as we move from East to West. In particular, there appears to be a very low correlation between the US and the Japanese and Australian markets. This simple test shows that the asynchronous market closing of these markets may artificially distort the computed correlations between these markets.

To investigate further, we lag the US market returns. That is, we compute correlations between each test market's returns and the previous day's US returns. This should indicate which markets are responding to the previous day's US market behavior.

FIG. 2 shows the correlations both with and without lagged US data. For all far-Eastern markets, a distinct positive correlation is shown. It appears that the low correlation between East and West is illusory, and the markets are more alike than the raw data would at first suggest.

But what of the markets in between? Where there is more overlap between the markets hours of trading, the current day's US behavior will have an increasingly greater effect on a particular market. Daily lagging data makes less sense for markets with partially overlapping trading. We can investigate this by consolidating the daily returns into weekly returns and computing the correlations between the weekly market returns. This will reduce the daily timing effect and give us a truer picture of market relationships.

FIG. 3 shows all three flavors of correlation between markets. The results are unambiguous: all markets show a significant positive correlation with the US market, with the developed markets showing the strongest relationship. Direct computation of market correlations using asset returns based upon the closing prices of markets that close at different times artificially distorts the relationships between the markets, and ultimately between the returns of these assets. There is a need to create factor risk models from daily price and return data that do not exhibit this problem.

Among its several aspects, the present invention recognizes that typical prior art approaches are subject to various deficiencies for portfolios whose assets or underlying assets are traded on markets whose hours of trading are different.

Current factor risk model systems may provide variance and covariance estimates with no indication of what the error in those estimates might be due to asynchronous trading. Improved factor risk models would be helpful when analyzing the risk of portfolios or constructing investment portfolios.

The current invention provides such an improved factor risk model that explicitly compensates for assets or underlying assets traded on markets whose hours of trading are different.

One aspect of the present invention is to provide techniques to model the correlations between asynchronously traded assets more realistically.

Another aspect of the present invention is to better model depository receipts whose underlying assets are traded asynchronously from the depository receipt.

Another aspect of the present invention is to provide better volatility predictions for portfolios whose assets are traded on markets whose hours of trading are different.

Another aspect of the present invention to better model the specific returns and specific risk of traded assets.

A more complete understanding of the present invention, as well as further features and advantages of the invention, will be apparent from the following Detailed Description and the accompanying drawings.

DETAILED DESCRIPTION

The present invention may be suitably implemented as a computer-based system, in computer software which is stored in a non-transitory manner and which may suitably reside on computer readable media, such as solid state storage devices, such as RAM, ROM, or the like, magnetic storage devices such as a hard disk or floppy disk media, optical storage devices, such as CD-ROM or the like, or as methods implemented by such systems and software.

Figure 1:
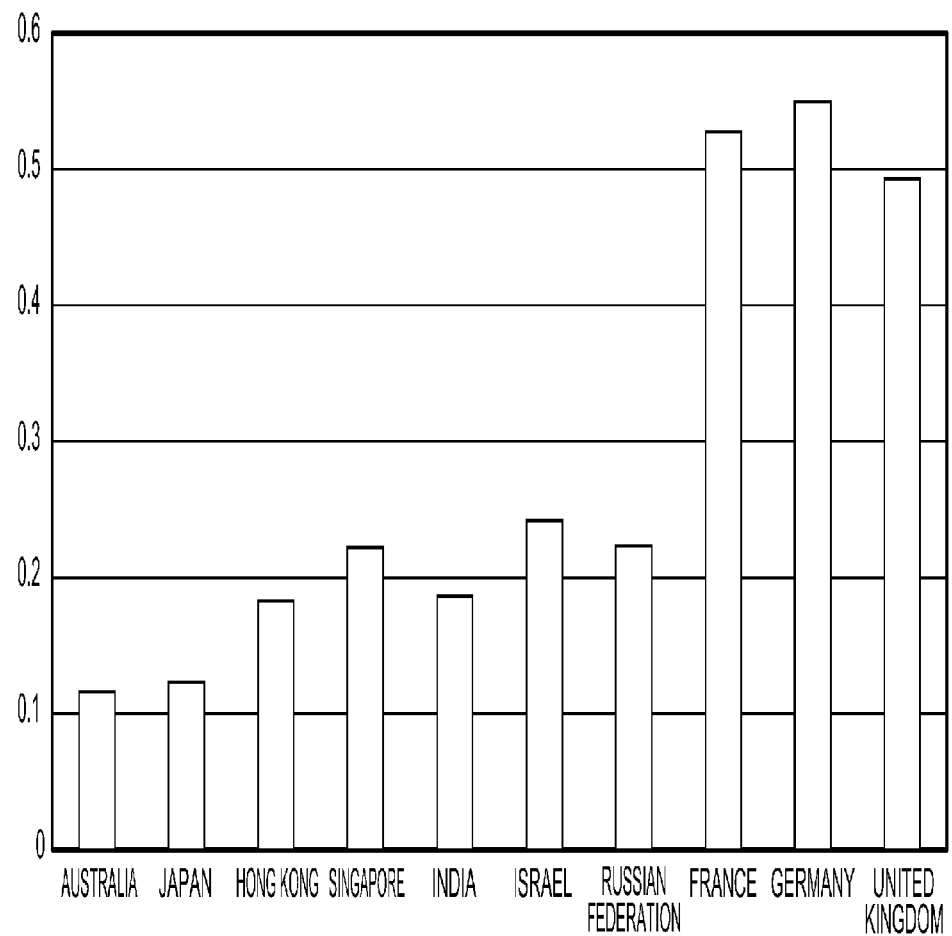
FIG. 1 shows correlations of ten global markets with the US market from 2000 to 2009.
Figure 2:
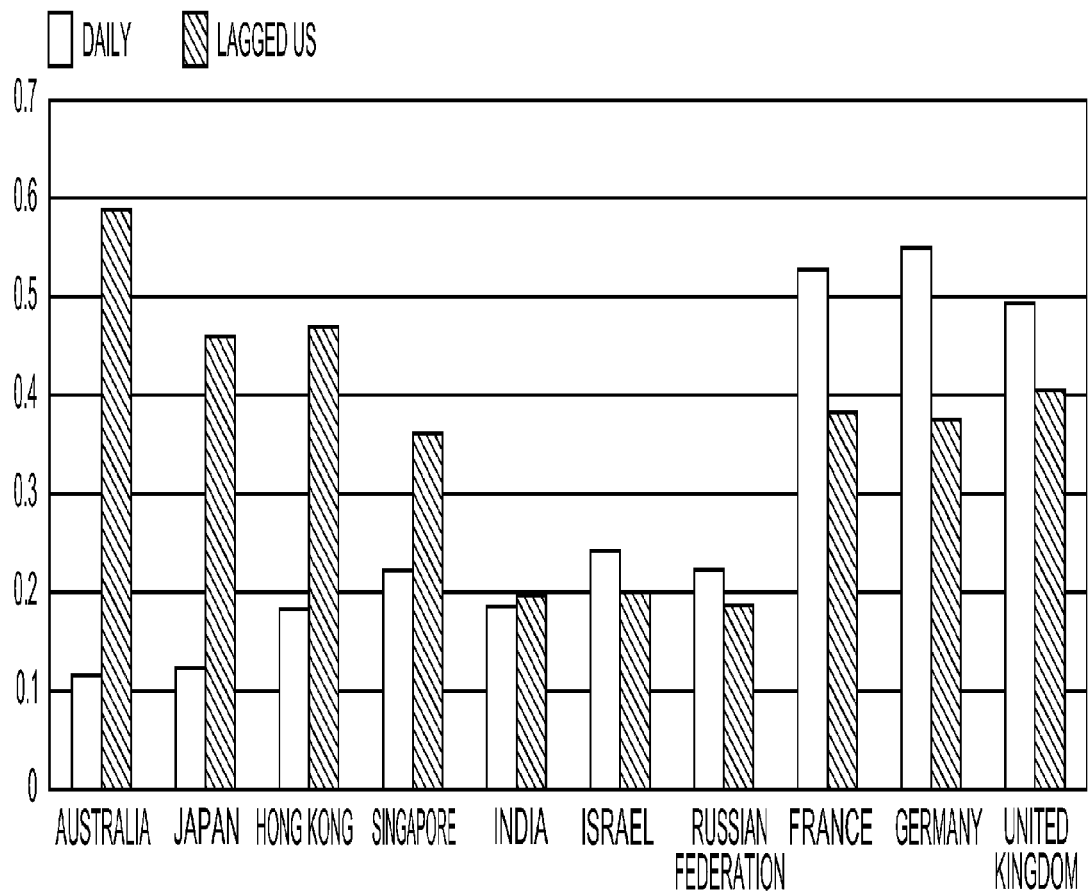
FIG. 2 illustrates correlations of the same ten global markets with the US market from 2000 to 2009 with and without lagged US data.
Figure 3:
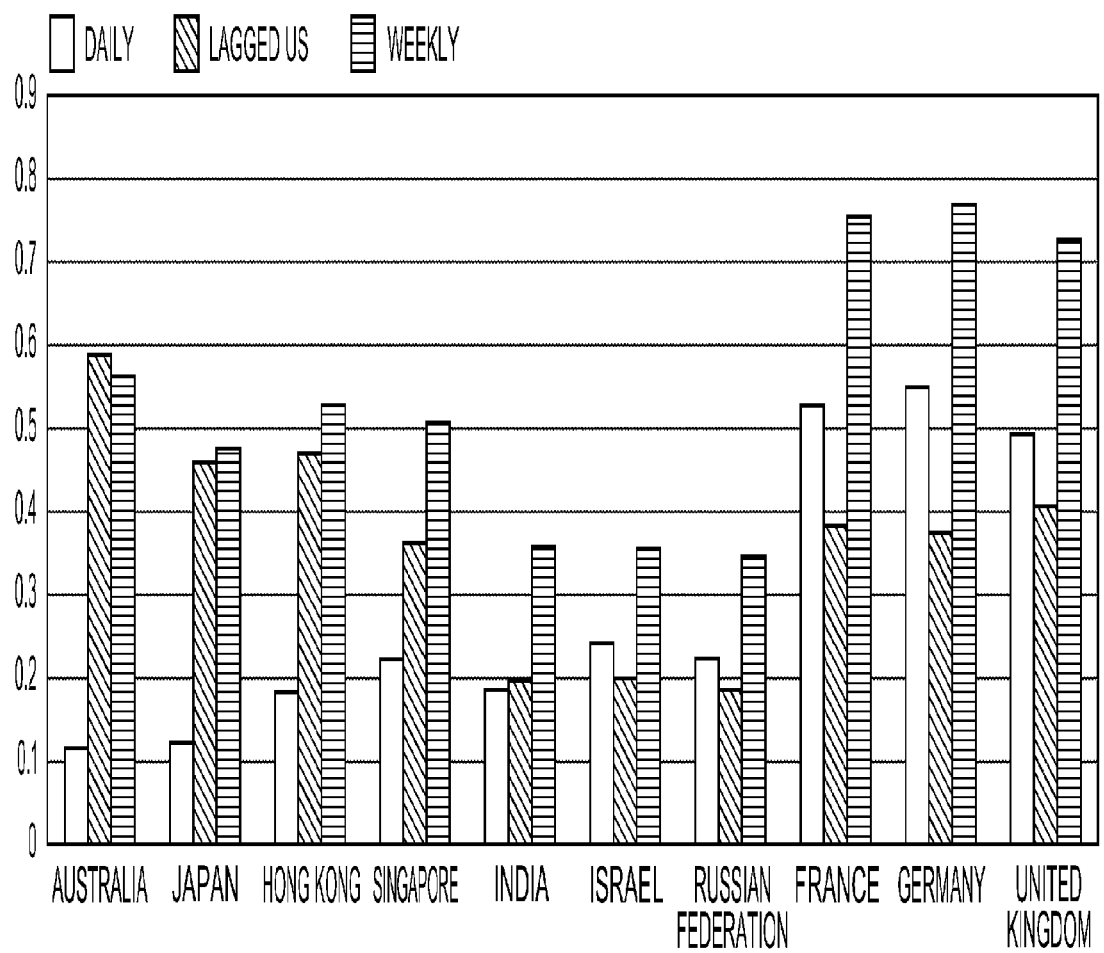
FIG. 3 illustrates correlations with the US market from 2000 to 2009 with daily, lagged and weekly data.
Figure 4:
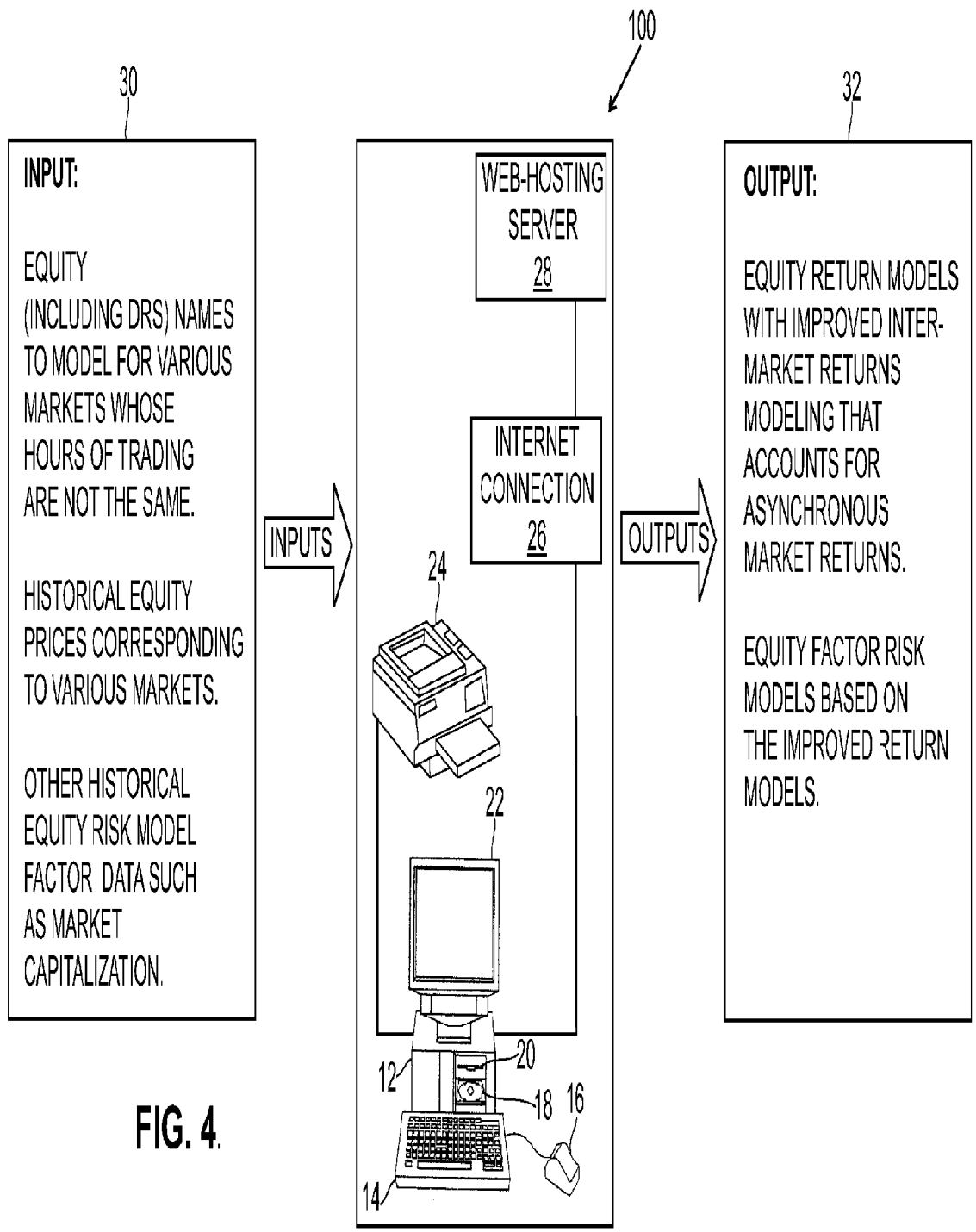
FIG. 4 shows a computer based system which may be suitably utilized to implement the present invention.

FIG. 4 shows a block diagram of a computer system 100 which may be suitably used to implement the present invention. System 100 is implemented as a computer 12 including one or more programmed processors, such as a personal computer, workstation, or server. One likely scenario is that the system of the invention will be implemented as a personal computer or workstation which connects to a server 28 or other computer through an Internet or other network connection 26. In this embodiment, both the computer 12 and server 28 run software that when executed enables the user to input instructions and calculations on the computer 12, send the input for conversion to output at the server 28, and then displays the output on a display, such as display 22, or is printed out, using a printer, such as printer 24, connected to the computer 12. The output could also be sent electronically through the Internet connection 26. In another embodiment of the invention, the entire software is installed and runs on the computer 12, and the Internet connection 26 and server 28 are not needed. In still a further embodiment, the Internet connection is replaced with a local area network. As shown in FIG. 4 and described in further detail below, the system 100 includes software that is run by the central processing unit of the computer 12. The computer 12 may suitably include a number of standard input and output devices, including a keyboard 14, a mouse 16, CD-ROM drive 18, disk drive 20, monitor 22, and printer 24. It will be appreciated, in light of the present description of the invention, that the present invention may be practiced in any of a number of different computing environments without departing from the spirit of the invention. For example, the system 100 may be implemented in a network configuration with individual workstations connected to a server. Also, other input and output devices may be used, as desired. For example, a remote user could access the server with a desktop computer, a laptop utilizing the Internet or with a wireless handheld device such as an IPad™, IPhone™, IPod™, Blackberry™, Treo™, or the like.

One embodiment of the invention has been designed for use on a stand-alone personal computer running in Windows (Microsoft XP, Vista, 7). Another embodiment of the invention has been designed to run on a Linux-based server system.

According to one aspect of the invention, it is contemplated that the computer 12 will be operated by a user in an office, business, trading floor, classroom, or home setting.

As illustrated in FIG. 4, and as described in greater detail below, the inputs 30 may suitably include equity names including depository receipts (DRs) for various markets whose hours of trading are not the same; historically observed equity prices corresponding to various markets; and other historical equity risk model factor data such as market capitalization.

As further illustrated in FIG. 4, and as described in greater detail below, the system outputs 32 may suitably include equity return models with improved inter-market return modeling that accounts for asynchronous market prices, and equity factor risk models based on the improved return models.

The output information may appear on a display screen of the monitor 22 or may also be printed out at the printer 24. The output information may also be electronically sent to an intermediary for interpretation. For example, risk predictions for many portfolios can be aggregated for multiple portfolio or cross-portfolio risk management. Or, alternatively, trades based, in part, on the factor risk model predictions, may be sent to an electronic trading platform. Other devices and techniques may be used to provide outputs, as desired.

With this background in mind, we turn to a detailed discussion of a presently preferred embodiment of the invention and its context. We begin with a model that attempts to predict what the market return of a country should be if it continued trading beyond its normal hours, based on its interaction with other markets that are still trading. In the discussion that follows, algorithms may be suitably implemented as software stored in memory and executed by a processor or processors in computer 12. Data may be input by a user or retrieved from a database or other storage. Data entered by a user may be entered using a keyboard, mouse, touchscreen display or other data entry device or means. Output data may be printed by a printer, displayed by a display, transmitted over the network to another user or users, or otherwise output utilizing an output device or means.

Assume that the expected value of market j at time t, $\hat{p}_t^j$ can be expressed in terms of the observed prices $p_t^j$ as $$ln(\hat{p}_t^j) = E(ln(p_t^j)|I_t) = E_t(ln(p_t^j)), \quad (1)$$

where $$I_t = \{p_{t_j}^j : t_j \le t, j=1, \ldots, J\}, \quad (2)$$

and J is the set of all markets trading. This tells us that the expected or synchronized price may be expressed in terms of the observed prices of all markets up until the current time.

These synchronized prices are unbiased estimates of the next recorded price if future price changes are unpredictable, thus:

$$ln(\hat{p}_t^j) = E(ln(p_{t_j+1}^j)|I_t) = E_t(ln(p_{t_j+1}^j)). \quad (3)$$

We define the J-vector of observed market returns on day t as $$r_t = ln(p_t) - ln(p_{t-1}), \quad (4)$$

and the vector of synchronized returns as $$\hat{r}_t = ln(\hat{p}_t) - ln(\hat{p}_{t-1}). \quad (5)$$

Then using equations (1)-(5), we may write $$\hat{r}_t = E_t(ln(p_{t+1})) - E_{t-1}(ln(p_t)) \quad (6)$$
$$= E_t(r_{t+1} + ln(p_t)) - E_{t-1}(r_t + ln(p_{t-1}))$$
$$= E_t(r_{t+1}) - E_{t-1}(r_t) + ln(p_t) - ln(p_{t-1}).$$

And hence $$\hat{r}_t = E_t(r_{t+1}) - E_{t-1}(r_t) + r_t. \quad (7)$$

We construct a model of returns via a vector auto-regressive moving average (VARMA) process, viz.

$$r_t = \sum_{j=1}^{P} N_j r_{t-j} + \sum_{j=1}^{Q} M_j \varepsilon_{t-j} + \varepsilon_t, \quad (8)$$

where $N_j \in \Re^{J \times J}$ and $M_j \in \Re^{J \times J}$ are the coefficients from the auto-regressive (AR) and moving average (MA) processes respectively, estimated historically. These enable future behavior to be predicted from that of the past. P and Q are the number of days' lags used, and $\varepsilon_t$ is the unpredictable part of the return (from t−1 or earlier). Substituting equation (8) into (7), and using the fact that $E_{t-1}(\varepsilon_t)=0$, our synchronized returns can be written $$\hat{r}_t = \sum_{j=1}^{P} N_j r_{t+1-j} + \sum_{j=1}^{Q} M_j \varepsilon_{t+1-j} - \quad (9)$$
$$\sum_{j=1}^{P} N_j r_{t-j} - \sum_{j=1}^{Q} M_j \varepsilon_{t-j} + \sum_{j=1}^{P} N_j r_{t-j} + \sum_{j=1}^{Q} M_j \varepsilon_{t-j} + \varepsilon_t.$$

This simplifies to $$\hat{r}_t = \sum_{j=1}^{P} N_j r_{t+1-j} + \sum_{j=1}^{Q} M_j \varepsilon_{t+1-j} + \varepsilon_t. \quad (10)$$

The form above is the most general possible form. Henceforth, for the sake of simplicity, we shall use a simple first-order VAR model, thus:

$$r_t = N r_{t-1} + \varepsilon_t, \quad (11)$$

while the synchronized returns are therefore given as $$\hat{r}_t = N r_{t-1} + \varepsilon_t. \quad (12)$$

We use (11) to model the actual returns in terms of the previous day's returns across all markets. We then use this model to create projected returns for the present day based upon the actual returns for the same day. Note that we can impose a great deal of prior structure on the coefficient matrix N. If we arrange the vector of markets in temporal order, from the earliest to the latest, then N should have minimal prior structure:

$$N = \begin{bmatrix} 0 & n_{1,2} & n_{1,3} & \ldots & n_{1,J-1} & n_{1,J} \\ 0 & 0 & n_{2,3} & \ldots & n_{2,J-1} & n_{2,J} \\ \vdots & \vdots & \vdots & \ddots & \vdots & \vdots \\ 0 & 0 & 0 & \ldots & 0 & n_{J-1,J} \\ 0 & 0 & 0 & \ldots & 0 & 0 \end{bmatrix}. \quad (13)$$

Thus, each market is modeled only in terms of those that close later. In practice, there will be a great many more zeros, as only a handful of markets will have any significant effect on the whole.

As a simple illustration, imagine two markets, A and B, which have no trading hours in common. In a particular week, market A sees returns of X, −X, X, −X and X for each consecutive day, while market B lags behind A by exactly one day and sees returns of −X, X, −X, X and −X. Thus, the correlation between the markets appears to be exactly minus one. The negative correlation between the markets is entirely due to the lag effect; in reality they are perfectly correlated. Moving to weekly returns would not help in this particular case: market A would have a return of X, while that of market B would be −X, and so we would still see negative correlation.

To model the return to market B in terms of the previous day's return to market A, we fit $$\begin{bmatrix} r_t^B \\ r_t^A \end{bmatrix} = \begin{bmatrix} 0 & 1 \\ 0 & 0 \end{bmatrix} \begin{bmatrix} r_{t-1}^B \\ r_{t-1}^A \end{bmatrix} + \begin{bmatrix} \varepsilon_t^B \\ \varepsilon_t^A \end{bmatrix}, \quad (14)$$

which gives us (for market B)

$$r_t^B = 1 \cdot r_{t-1}^A + 0. \quad (15)$$

Hence our adjusted return for market B is $$\hat{r}_t^B = 1 \cdot r_{t-1}^A \cdot \quad (16)$$

Thus, the adjusted market return for B would be exactly that of market A each day, and both our markets after adjustment, would be perfectly correlated.

This example illustrates the difficulties arising from asynchronous prices and returns. It is possible that the two markets really are exactly negatively correlated, and that our correction has, in fact, made things worse. If the two markets had similar opening hours, such a conclusion would be a reasonable one. However, in real life, many markets open and close at different times so such a simple correlation analysis is rarely appropriate.

Turning to an application of such insights to risk models, following Litterman's approach to multi-factor risk modeling, our basic returns model at a point in time t is as follows:

$$r_t = B f_t + u_t. \quad (17)$$

Where B is a matrix of factor exposures, $f_t$ is a vector of factor returns, and $u_t$ is a vector of asset specific (idiosyncratic) returns. We make the assumption that each asset return, $r_t^i$ may be written as $$r_t^i = r_t^{im} + \gamma_t^i, \quad (18)$$

where $r_t^{im}$ is the return to i's local market (the market on which the asset trades), and $\gamma_t^i$ is the remainder, non-market, term.

Using the set of J local market returns, we construct a VAR model of local market returns using (11) above.

$$r_t^m = N r_{t-1}^m + \epsilon_t \quad (19)$$

We then use the coefficient matrix N above to estimate a set of forecast market returns $$\hat{r}_t^m = N r_t^m + \epsilon_t \quad (20)$$

and these projected market returns are then used to adjust each asset return, viz.

$$\hat{r}_t^i = \hat{r}_t^{im} + \gamma_t^i \quad (21)$$

Using (18) we rewrite (21) as $$\hat{r}_t^i = r_t^i + \Delta_t^{im} \quad (22)$$

where the returns-timing adjustment factor, $\Delta_t^{im}$ is defined as $$\Delta_t^{im} = \hat{r}_t^{im} - r_t^{im} \quad (23)$$

We may then use the set of adjusted asset returns from (22) in the model factor regression $$\hat{r}_t = B \hat{f}_t + u_t \quad (24)$$

The above formulas describe a model of synchronized asset returns. It is possible to use this model to correct observed asset returns and construct a factor risk model from these corrected asset returns. However, there are advantages to computing the adjustment to the factor risk model directly from the observed returns and the synchronization model. For example, the factor returns of a risk model can be directly adjusted as follows. Recall that we compute an adjusted asset return $$\hat{r}_t^i = r_t^i + \Delta_t^{im} \quad (25)$$

where $\Delta_t^{im}$ is the returns-timing adjustment to market m based on some reference market, which is generally the US. For factor risk model construction, we are concerned with the cross-sectional model at a point in time, so we simplify the notation by "dropping the t" and writing $$\hat{r}_i = r_i + \Delta_{i_m} \quad (26)$$

However, we need not use the adjusted asset returns directly in the factor regression. We write the unadjusted returns factor decomposition as $$r_i = g + f_{i_m} + \Psi_i + u_i, \quad (27)$$

where:
g is the global market return,
$f_{i_m}$ is factor return to market m,
$\Psi_i$ is the remaining factor structure (styles, industries) of no relevance here,
$u_i$ is asset i's specific return.

See, for example, "Axioma's Risk Model Primer", September 2010, which is incorporated by reference in its entirety, for further details of multi-factor risk modeling, and, in particular, this decomposition. Regression (27) is also subject to a constraint of the form $$\sum_{j=1}^{J} w_j f_j = 0 \quad (28)$$

on the country factor returns, where $w_j$ are some suitable weights. There will also be a corresponding constraint on the industry returns.

If we assume a one-to-one correspondence between the assets within each market in the factor model and the assets used to compute the local market adjustments, then the returns-timing adjusted factor regression may be implicitly solved as $$r = [g + \Lambda_g] + [f_{i_m} + \Delta_{i_m} - \Lambda_g] + \Psi_i + u_i \quad (29)$$

where $$\Lambda_g = \sum_j w_j \Delta_j \quad (30)$$

Equation (29) is a consistent solution to the adjusted-return regression, since by construction $$\sum_{j=1}^{J} w_j [f_j + \Delta_j - \Lambda_g] = 0 \quad (31)$$

and so the regression constraint is satisfied. Note that only the market returns, global and local, are affected. Other factors such as styles, industries, and the like, remain unaltered by this transformation. This approach is an important modeling improvement, as it allows the multi-factor risk model to be computed without explicitly solving for or storing the synchronized prices or returns. This is much more efficient than a direct application of a synchronized set of prices in multi-factor risk modeling.

For computing the adjusted market returns, the ideas put forward above have been put into practice with the Axioma Research Global Model. The only computational issue is in estimating the coefficient matrix N. For this a history of daily market returns is used and the N matrix is computed daily, viz.

$$\begin{bmatrix} r_t^1 & r_{t-1}^1 & \cdots & r_{t-T}^1 \\ r_t^2 & r_{t-1}^2 & \cdots & r_{t-T}^2 \\ \vdots & \vdots & \ddots & \vdots \\ r_t^J & r_{t-1}^J & \cdots & r_{t-T}^J \end{bmatrix} = N \begin{bmatrix} r_{t-1}^1 & r_{t-2}^1 & \cdots & r_{t-T-1}^1 \\ r_{t-1}^2 & r_{t-2}^2 & \cdots & r_{t-T-1}^2 \\ \vdots & \vdots & \ddots & \vdots \\ r_{t-1}^J & r_{t-2}^J & \cdots & r_{t-T-1}^J \end{bmatrix} \quad (32)$$

T=60 is used to give an approximately three month horizon to the model. We solve (32) using non-negative least squares: that is, we require that all elements of N be non-negative. The reason for this is that, given that many local market returns are highly correlated through time, ordinary unconstrained least squares tends to give many positive/negative pairs of coefficients, all significant, and all cancelling each other. Constraining all elements of N to be non-negative prevents this and results in a more realistic N.

Figure 5:
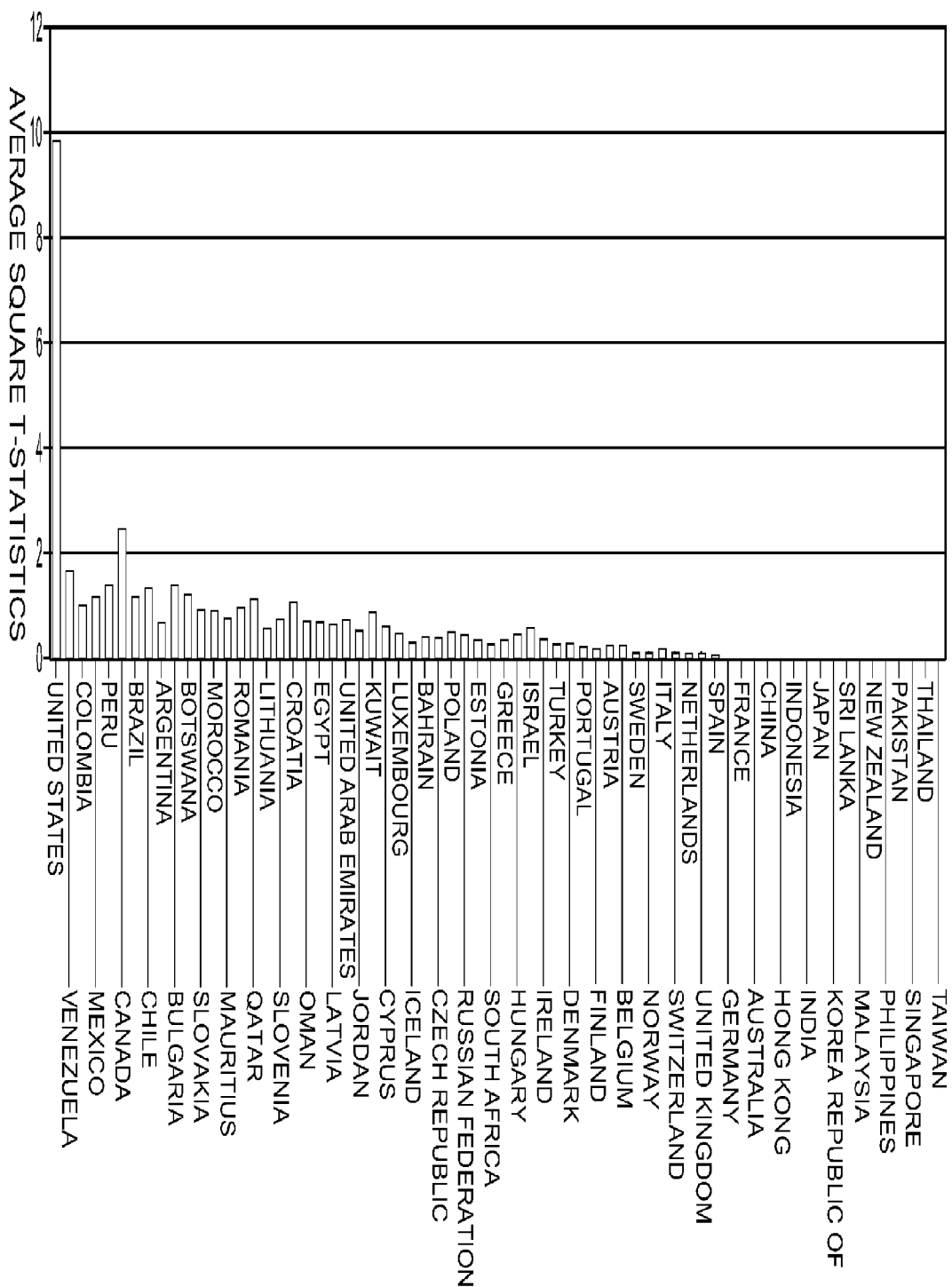
FIG. 5 illustrates average square T-statistics of the N coefficients over ten years of a global model.

FIG. 5 plots the average square T-Statistics of the estimated coefficients of N over ten years of the global model, where each column represents the significance of a particular market, given along the x-axis, to all other markets in the model. The only consistently significant values are those relating to the US market. We therefore model all other local market returns in terms of the behavior of the US market alone. Since the US market is among the last to close, it should, in an ideal world, contain information about everything that has happened in the world in the rest of the day. So only the column of N corresponding to the US market return is permitted to be non-zero.

Figure 6:
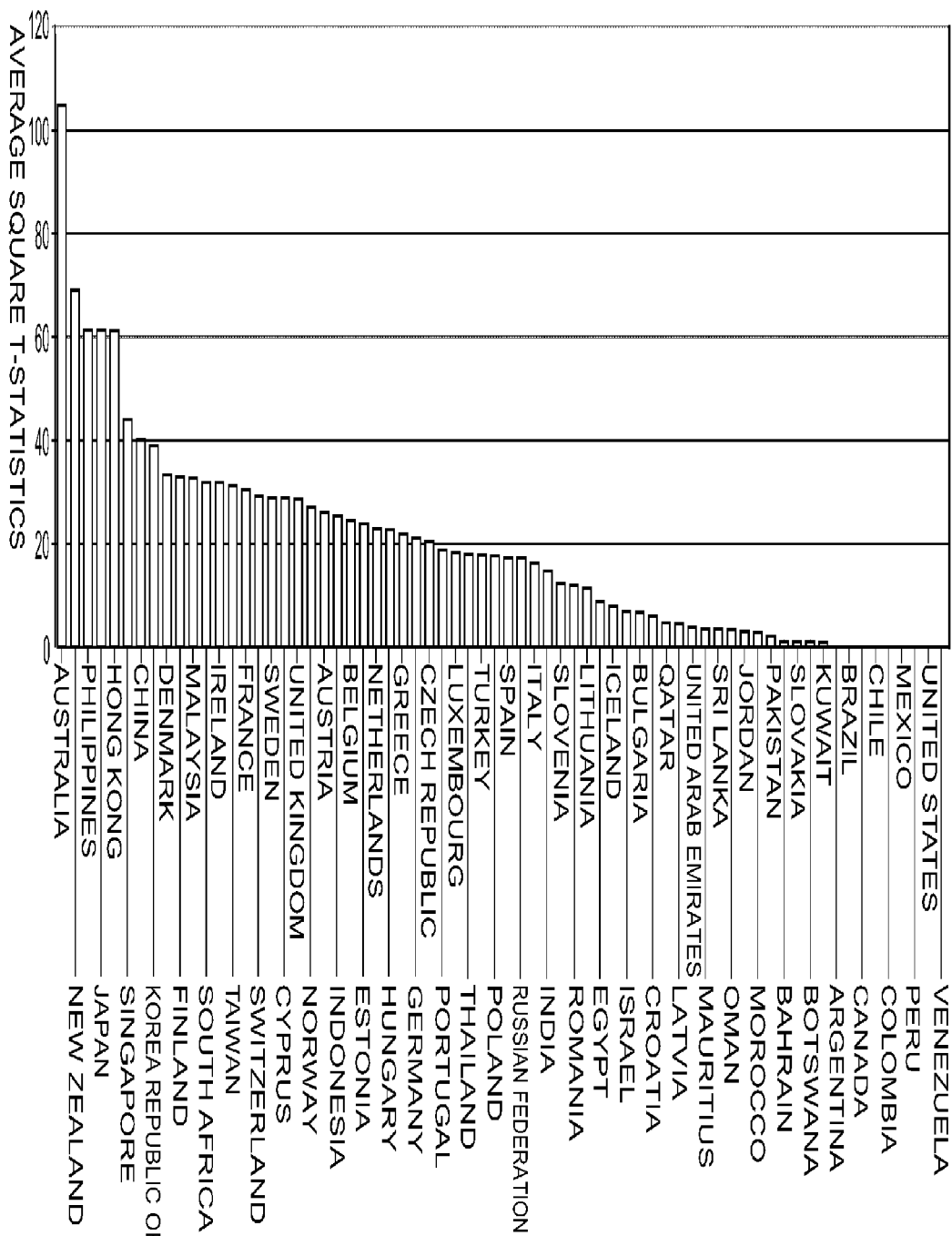
FIG. 6 illustrates average square T-statistics of the N US market coefficients.

FIG. 6 shows the significance of the non-zero coefficients of N over time, once we have imposed this structure.

A first study illustrates how well this models works by constructing a simplified global model, which consists only of country factors. Thus, each factor return is simply the weighted sum of the asset returns within each country. The correlations between the US market and a set of test markets are then computed.

Figure 7:
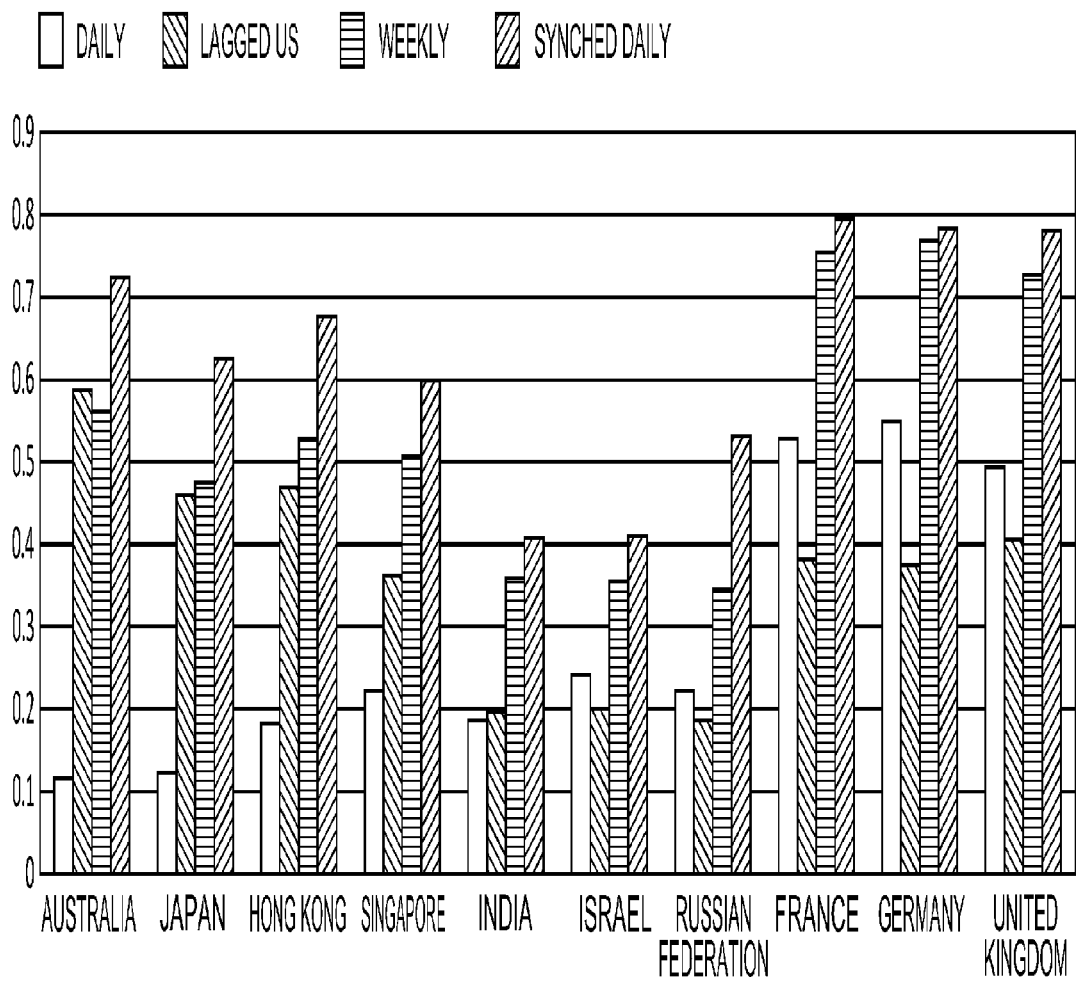
FIG. 7 illustrates correlations between the US and other market returns 2000-2009 for the global model.

FIG. 7 shows the effect of using synchronized returns in the model. All markets now show a strong correlation with the US. In every case, the synchronized model shows a correlation equal to or even greater than the weekly data. If anything, it would appear that we're overcompensating for the most Easterly markets. This presupposes, however, that any one of these sets of correlations is exactly true. FIG. 7 shows results where a single correlation has been computed for each market over the entire history of data. In practice, we use a rolling window of data values, which shifts through time.

Figure 8:
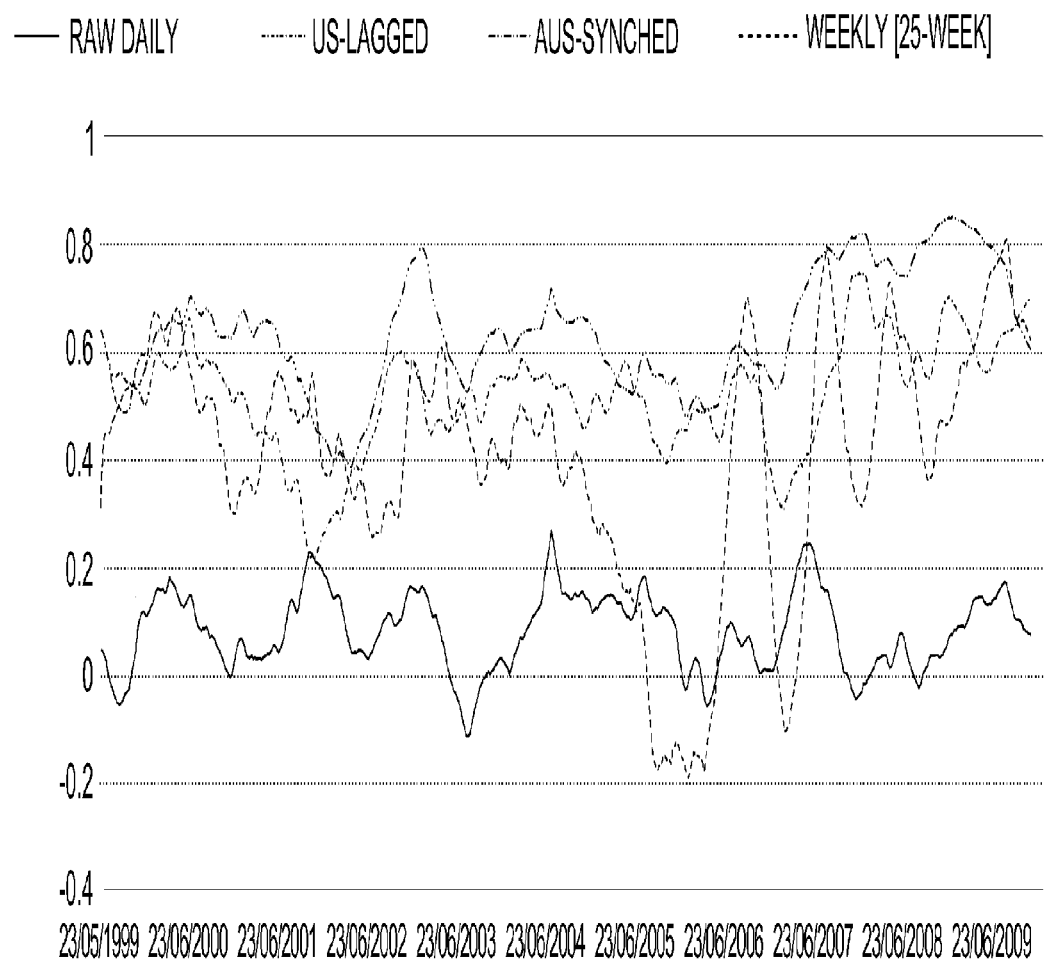
FIG. 8 illustrates rolling correlations between AUS and USA.

FIG. 8 shows how correlations between the US and Australia (AUS) changed over ten years. Three daily correlations are computed: raw returns, lagged US returns and synchronized Australian returns, using a 22-day rolling window, and a set of weekly correlations using a 25-week rolling window. Also shown is the correlation obtained after using the model of synchronized returns. The weekly-return correlation is very unstable, particularly from the middle of the decade onwards. This instability accounts for the weekly correlation in FIG. 7 being substantially lower than the synchronized figure.

Figure 9:
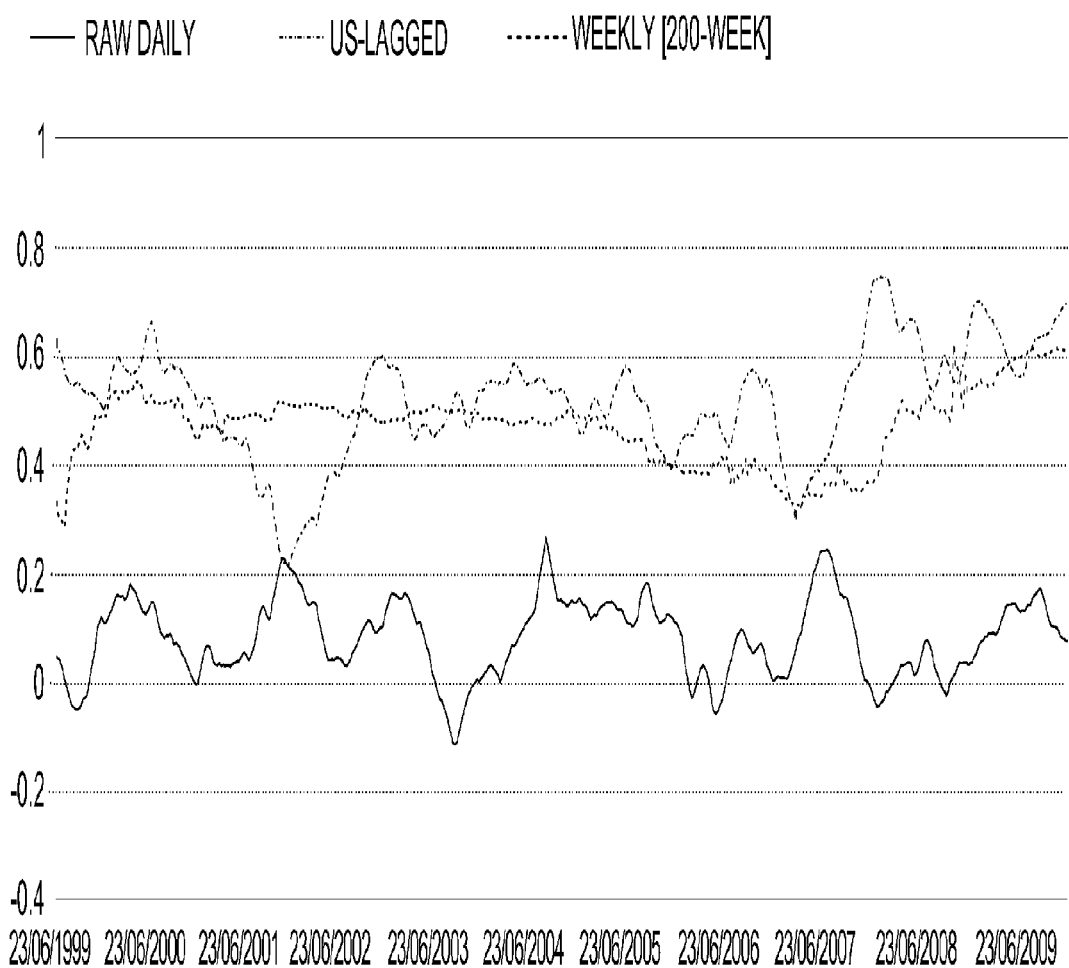
FIG. 9 illustrates rolling correlations between AUS and USA.

FIG. 8 demonstrates the problems inherent in computing correlations using lower-frequency data with a short history of observations. Correlations are very sensitive to extreme values in the data and easily influenced one way and the other over short periods. The lagged and the synchronized daily correlations are far more consistent over time. The alternative is to use a longer history of data for weekly return correlations. FIG. 9 shows a comparison of raw daily and US-lagged daily correlations with weekly correlations using 200 weeks of data per estimate.

The rolling correlations with longer history are far more consistent with those with shorter history, but also now very unresponsive, almost flat-lining. This is fine for a long-horizon model, but our aim is to build stable short-to-medium term models.

The alternative to synchronized daily data is lower frequency data. This involves either short histories and unstable correlations, or long histories and unresponsive correlations. Both are unattractive in comparison to synchronized daily data.

In a second study, a full global model contains more factors than the simple test model we have used so far. The new factors include industry, styles, and currency factors. Most importantly, the weighted country factor returns are constrained to sum to zero. Since the US market accounts for over one third of the total market size, this has the effect of inducing negative correlation between the US market factor and most other country factor returns. Thus, in a full model, we see negative correlations become less negative once the returns are adjusted.

Figure 10:
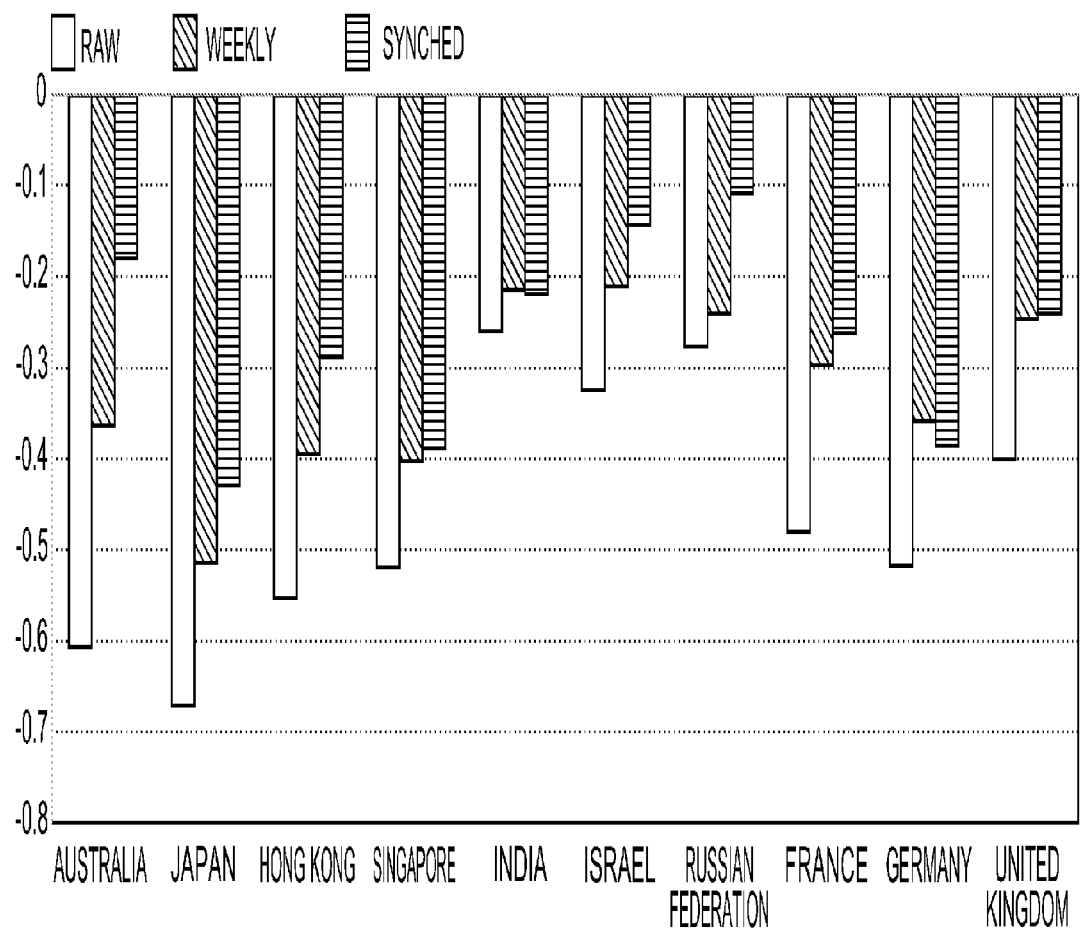
FIG. 10 illustrates correlations with the US market factor return from 2000 to 2009.

FIG. 10 shows what the correlations across markets look like in a full global model, with and without returns-timing adjustment.

Figure 11:
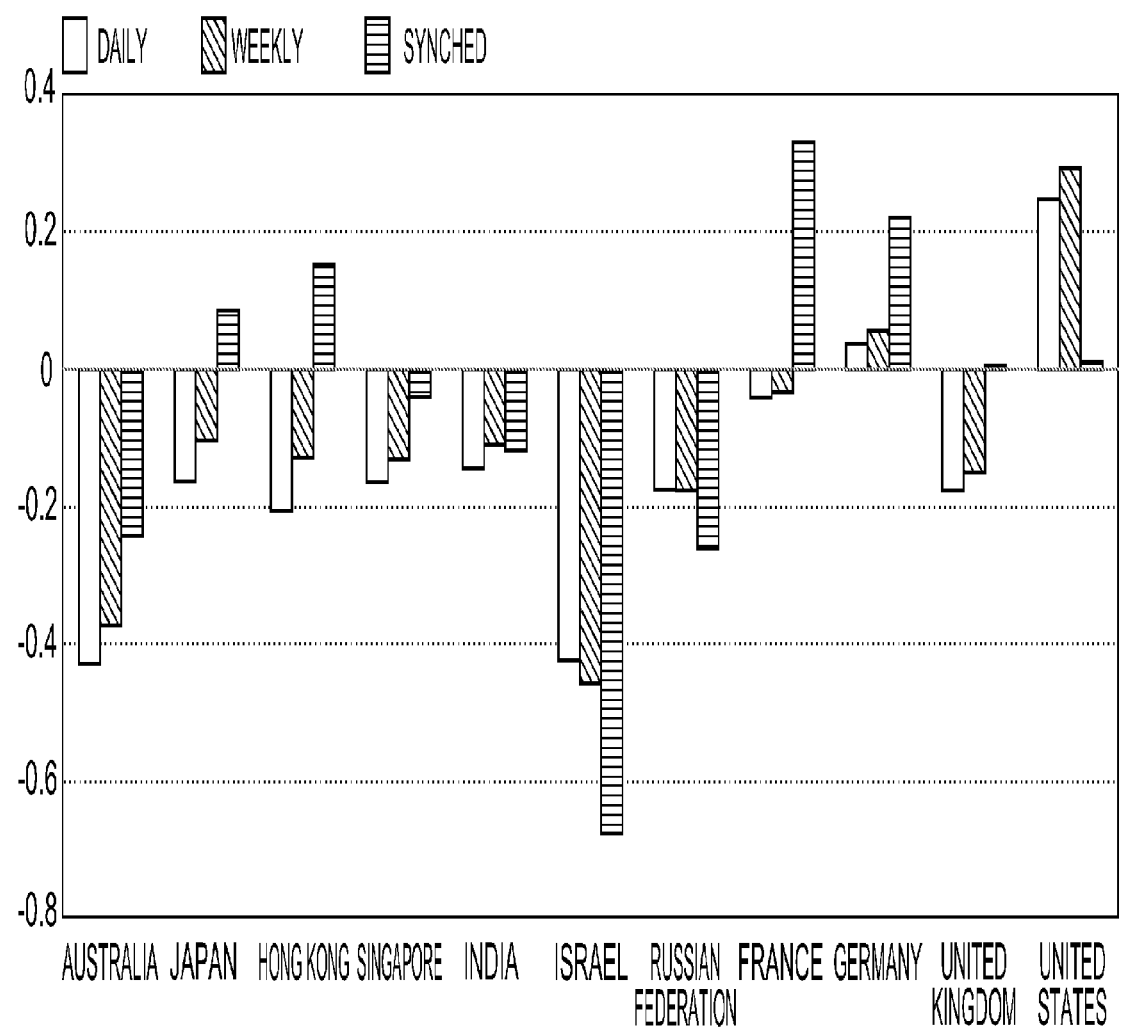
FIG. 11 illustrates correlations with the global market factor return from 2000 to2009.

By way of interest, correlations of our ten test markets plus the US with the Global Market factor return are shown in FIG. 11.

Of note is the fact that the correlations of the big three (US, Japan and UK) with the global market factor become negligible after synchronization. This is because all of their global component is now in the global factor and not being misattributed to the countries. See "Axioma's Risk Model Primer" for further details.

Figure 12:
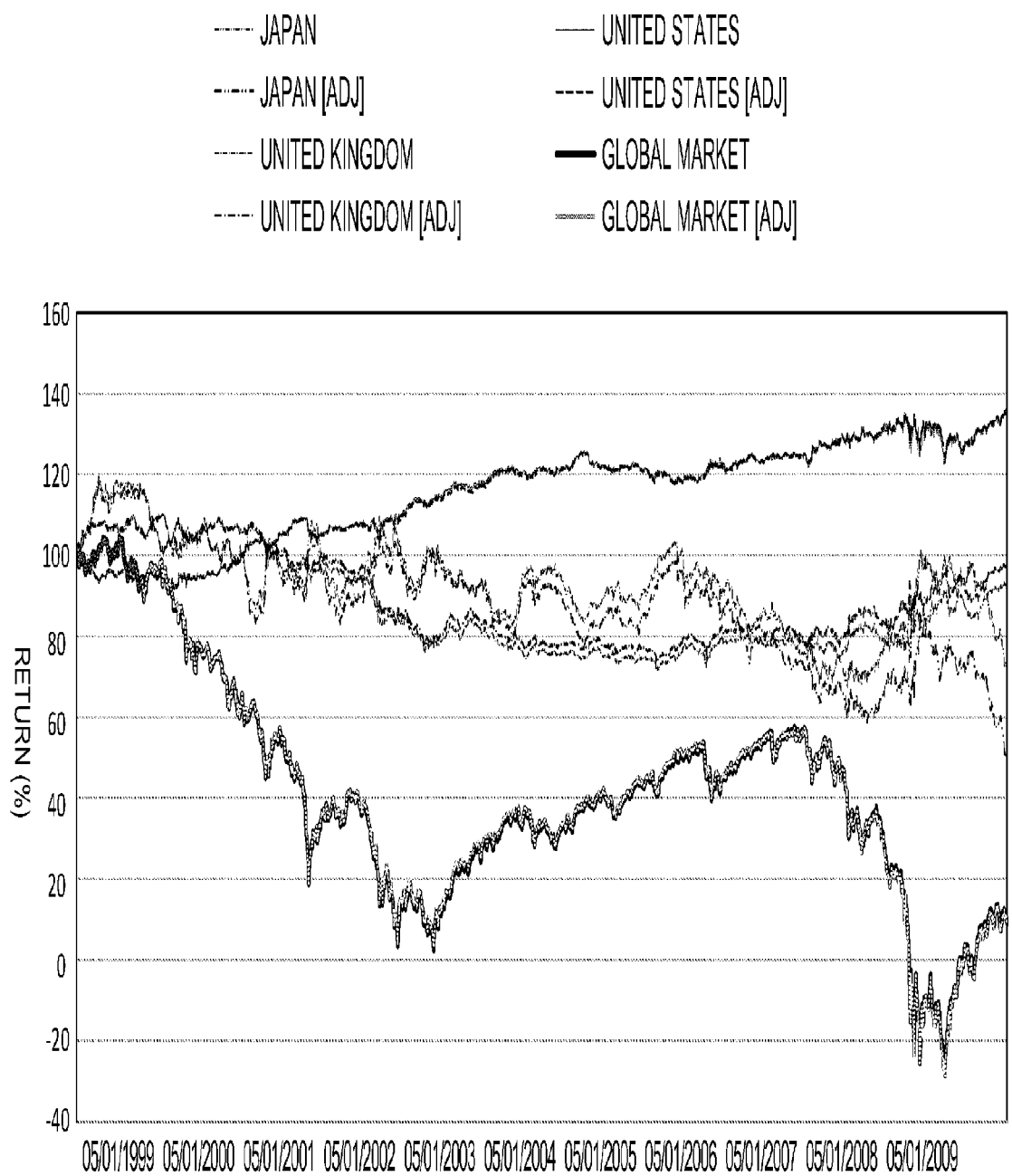
FIG. 12 illustrates cumulative returns with and without returns-timing adjustment.

FIG. 12 shows cumulative returns for a small selection of factors with and without returns-timing adjustment. Although small, there is a change to the US market return, due to the factor return constraint.

In a third study, the same full global model as before is used, but realized and predicted benchmark volatility over time are compared.

Figure 13:
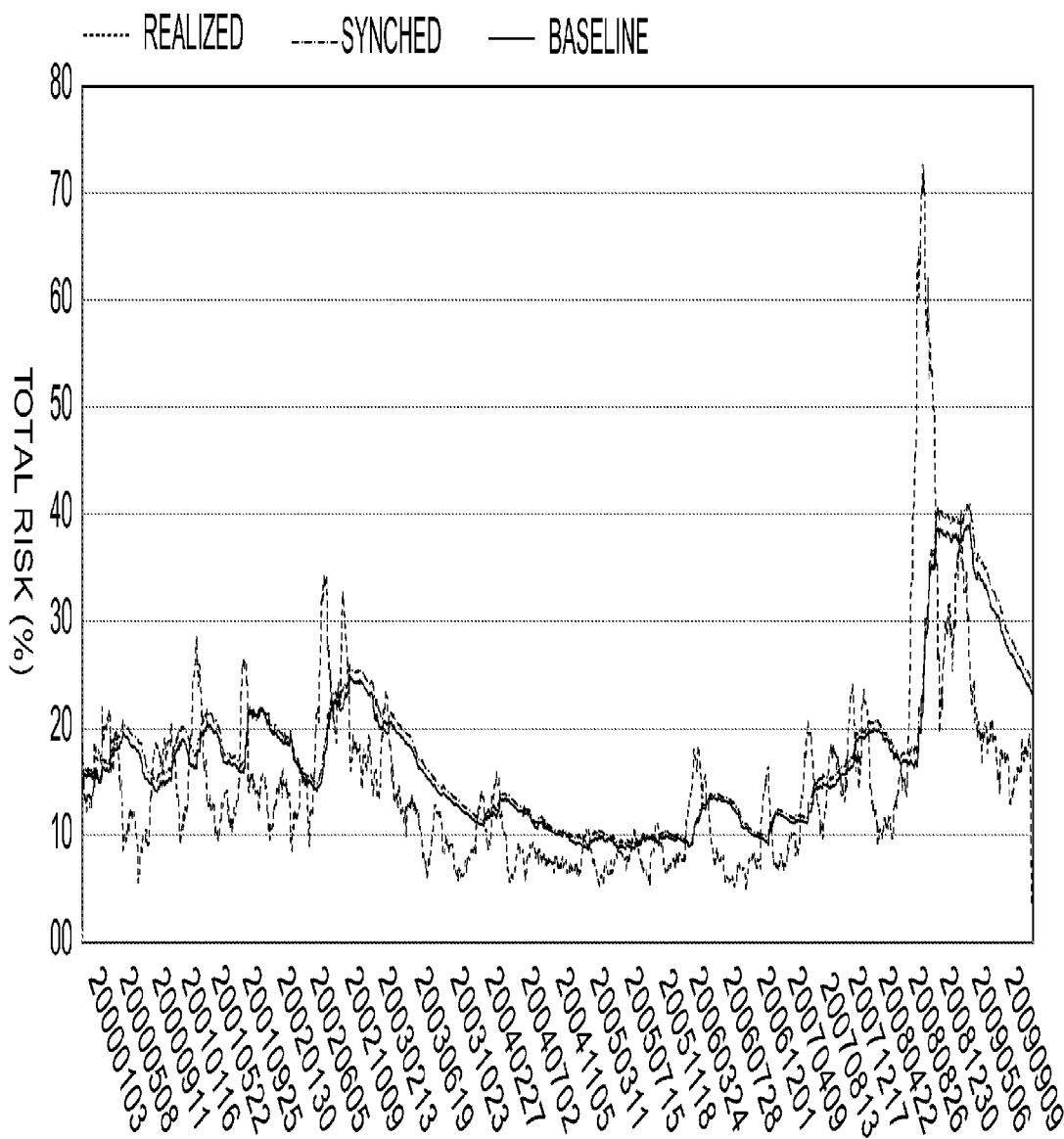
FIG. 13 illustrates cumulative returns with and without returns-timing adjustment.

FIG. 13 shows the effect on the total volatility of a benchmark of approximately 3000 global stocks, comparing unadjusted and adjusted volatility predictions with realized daily volatility. Although the differences are small, the synchronized model has improved performance, particularly during the last two years.

Note that the realized returns are computed using unadjusted data and therefore contain the very errors we are trying to eliminate from the model factor returns. A plot using weekly data would show even better performance. If our markets are more aligned after returns-timing adjustment, then we should obtain improved active risk plots based upon weekly returns, since market return behavior (global and local market) is not being misattributed and spilling into the active risk component.

Figure 14:
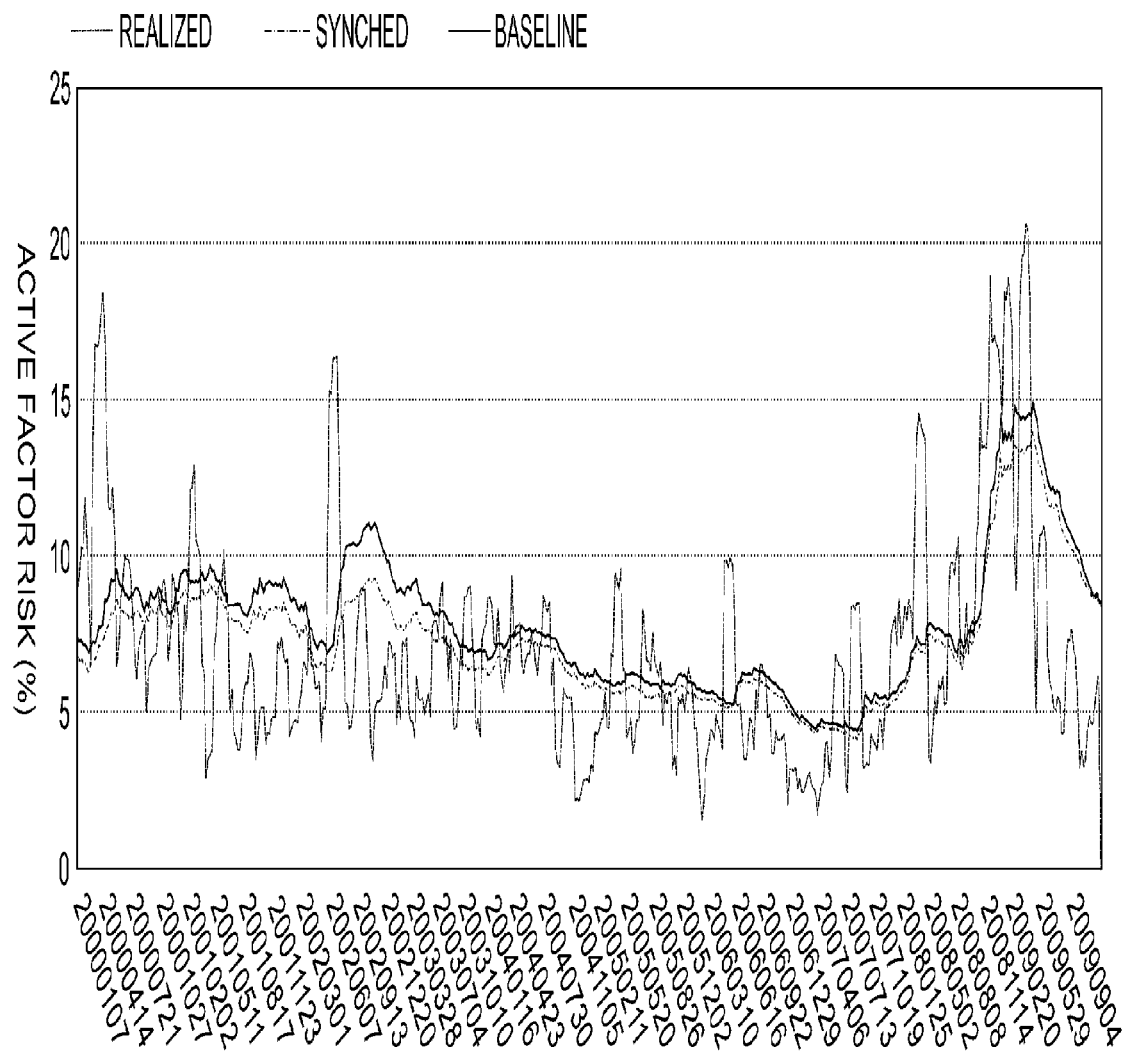
FIG. 14 illustrates weekly volatility for the a benchmark of approximately 500 European stocks and a benchmark of approximately 3000 global stocks.

FIG. 14 shows weekly factor volatility plots for a benchmark of approximately 500 European stocks compared to a benchmark of approximately 3000 global stocks. The results are good. In the period 2002-2003, the adjusted model seems to be much closer overall to the realized weekly volatility.

Figure 15:
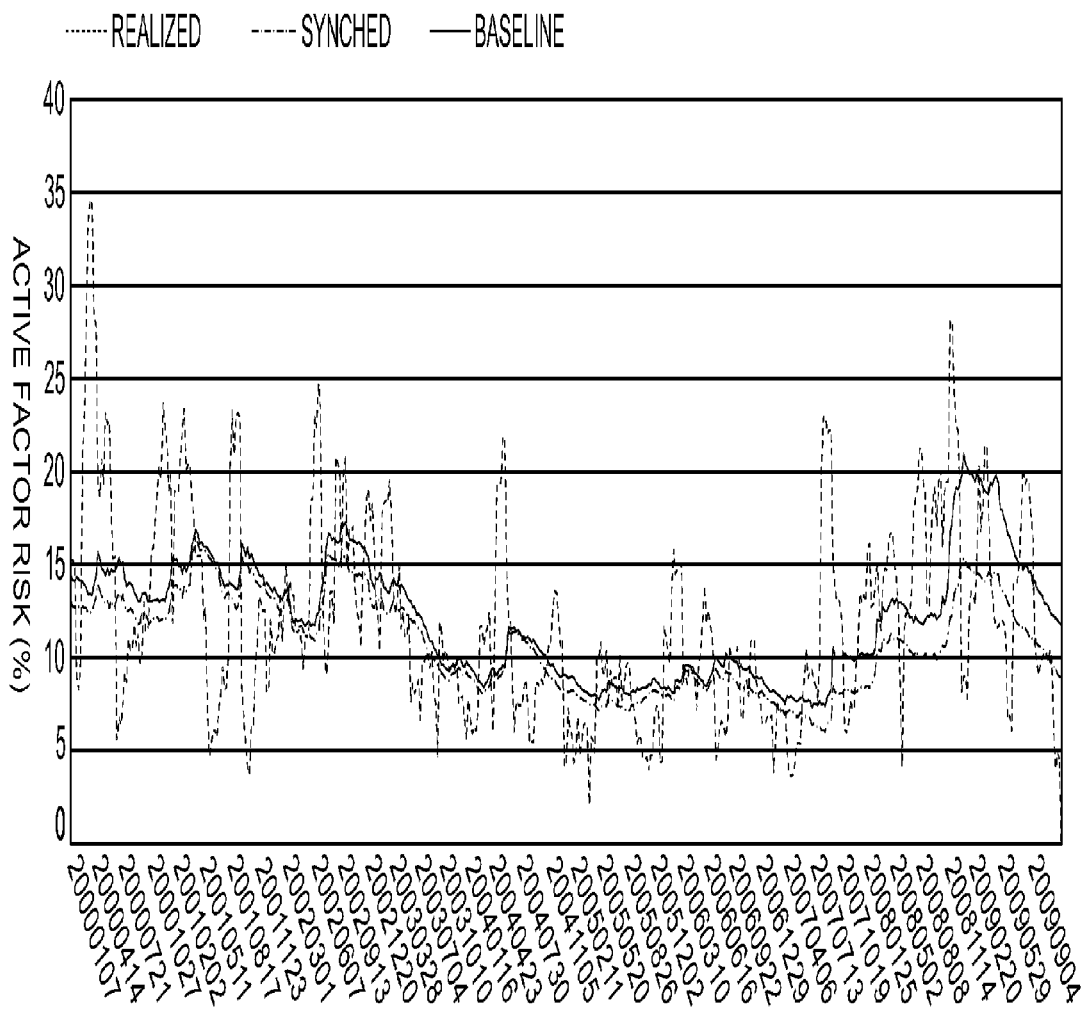
FIG. 15 illustrates weekly volatility compared with returns for a benchmark of approximately 3000 Asian and Pacific region stocks and a benchmark of approximately 3000 global stocks.

FIG. 15 shows the results for a benchmark of approximately 3000 Asian and Pacific region stocks compared to a benchmark of approximately 3000 global stocks. There is a huge difference in predicted active volatility in the last two years between the two models, with and without returns-timing adjustment. The synchronized model is better. The realized weekly returns are no more volatile overall than at many other times in the benchmark history. The huge difference in predicted volatility for 2008 in particular is due to the unadjusted results being based upon returns that are contaminated with misattributed market behavior.

Figure 16:
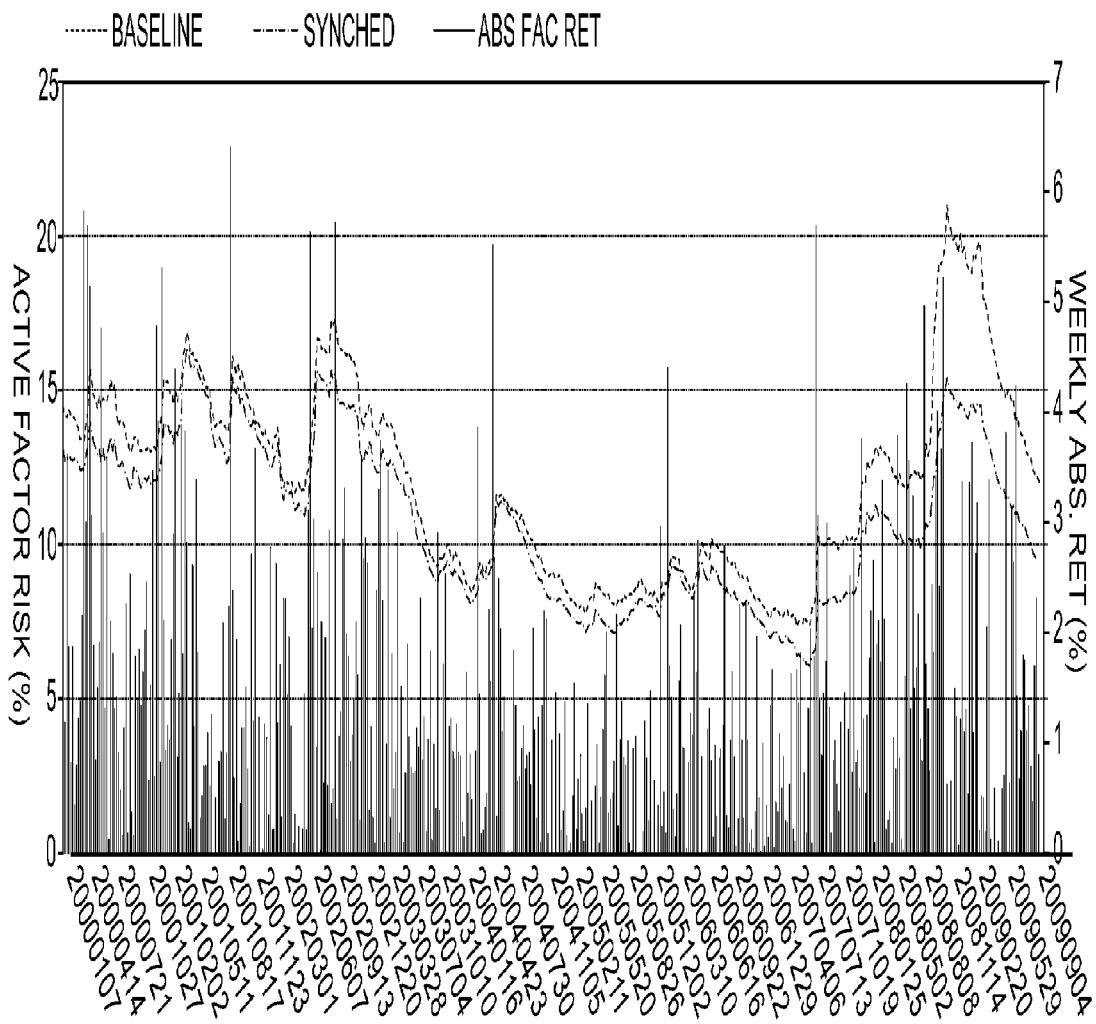
FIG. 16 illustrates weekly volatility for the a benchmark of approximately 3000 Asian and Pacific region stocks and a benchmark of approximately 3000 global stocks.

FIG. 16 shows this clearly. It plots the absolute weekly returns alongside the unadjusted and adjusted volatilities. There is no dramatic increase in the returns during 2008 and beyond to warrant the huge increase in the unadjusted volatility.

The examples so far have included only simple assets that are listed and trade on a single market. In practice, we must consider the case of American depository receipts (ADRs), global depositary receipts (GDRs), cross listings etc., where an asset is quoted on a foreign market, with or without an underlying asset trading on the home market. Henceforth, we refer to such assets collectively as DRs for the sake of convenience.

We model DRs as follows. First, convert the return from the DR's quoted currency to the currency of the underlying asset or assets. Then, assign exposure both to the home market and currency (e.g., the market and currency of the underlying asset or assets) rather than the DR's market and currency.

This is done to ensure a close match in exposures and factor risk between each DR and its underlying asset. Because of this approach, there remains a component of common return in each DRs specific return due to the different closing times between the two markets involved.

Assume then that we have converted the DR's return to the home currency. We define the home market of DR i as $i_m$, and its market of quotation as $i_q$. We model the return of the DR as $$r^i = g + f_{i_m} + \Psi_i + \Delta_{i_m i_q} + u_i, \tag{33}$$

where $\Delta_{i_m i_q}$ is the difference in market return between markets m and q. Unfortunately, this DR returns-timing component is not taken account of in the factor regression, since the DR has exposure only to the underlying home market. It pollutes the residual return, rendering it not truly specific:

$$\hat{u}_i = u_i + \Delta_{i_m i_q}, \tag{34}$$

where $u_i$ is the true specific return, but $\hat{u}_i$ is what we're actually left with from the regression.

To deal with this structured residual component, we write the returns timing adjustment factor for a market m relative to a reference market, R, (such as the US) as $\Delta_{i_m R}$. In the case of log returns $$\Delta_{i_m i_q} = \Delta_{i_m R} - \Delta_{i_q R} \tag{35}$$

We compute the DR's specific return as $$u_i = \hat{u}_i - \Delta_{i_m R} + \Delta_{i_q R} \tag{36}$$

and we have, in effect, made the DR return decomposition truly local. The factor return is genuinely that pertaining to the home market, m, while the specific return contains no structure due to the differences in timing across markets.

Figure 17:
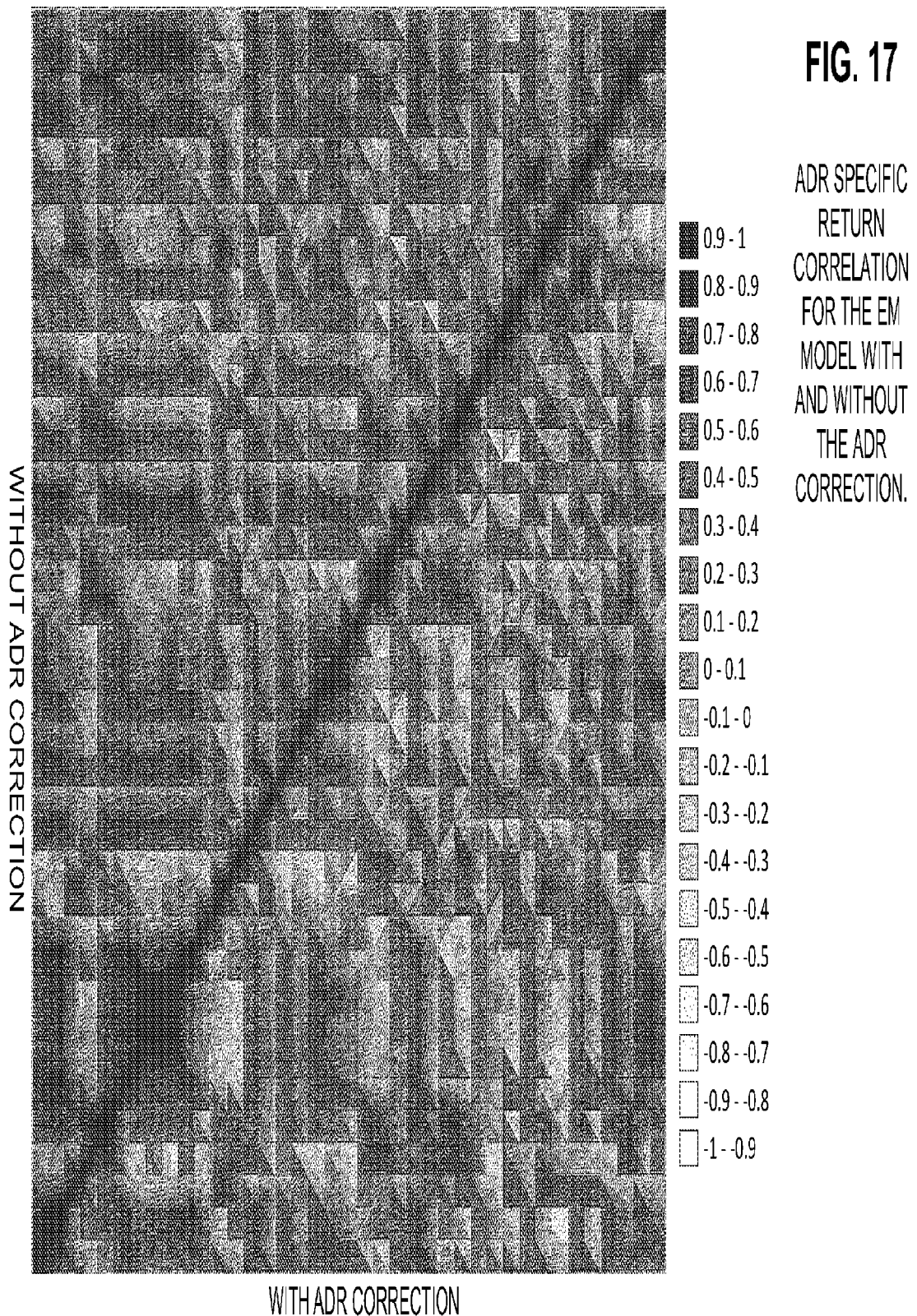
FIG. 17 illustrates ADR specific return correlations for an emerging markets (EM) risk model with and without the ADR correction.
Figure 18:
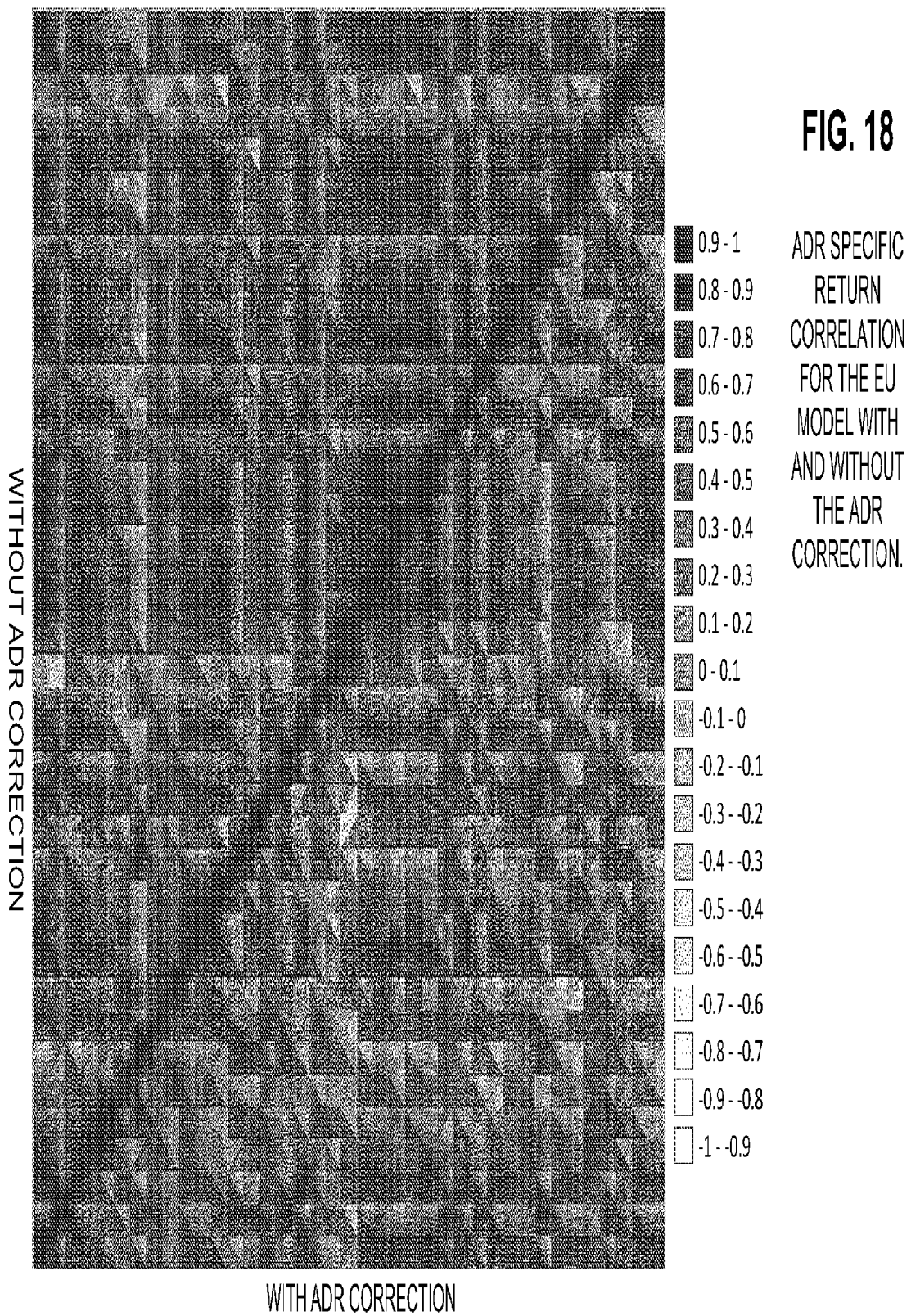
FIG. 18 illustrates ADR specific return correlations for a European (EU) risk model with and without the ADR correction.

FIG. 17 shows the application of this in the Axioma Emerging Markets (EM) Model. The left hand half of the plot shows a heat map of specific returns correlations for the top forty ADRs, by market capitalization, in the emerging markets (EM) factor risk model for the second half of 2008 where no correction has taken place for returns-timing. The right-hand side shows the same results but after correction for timing. There is a clear improvement in that many of the spurious high correlations (>0.5, say) have been reduced We see a greater reduction of correlations than in FIG. 18 which compares the specific return correlations with and without correction for the top forty ADRs in Axioma's European (EU) Risk Model. The greater reduction in specific return correlation is likely due to the more developed liquid nature of the market, which renders the returns-timing corrections more valid. What is particularly interesting is that the European (EU) factor risk model does not use returns-timing adjustments to its factor returns, since Europe falls within a small handful of time zones, but we still apply a returns-timing adjustment to the ADR specific returns since the ADRs can track assets that trade outside the European market.

The present invention may be applied to provide other improvements, such as a moving average (MA) component resulting in a VARMA model or a combination VARMA model.

A further enhancement to the returns-timing algorithm creates a more complex temporal model of returns for use in the VARMA model. In one preferred embodiment, an asset's return is decomposed into a local market and a residual component. However, a section of a market, such as banks, can move one day causing the banking sector in other parts of the world to move the next day. Thus, we can use a model for returns of the form $$r_t^i = r_t^{im} + r_t^{is} + \gamma_t^i \tag{37}$$

where $r_d^{is}$ is the sector return, net of the overall market, for a particular time zone or band of time-zones.

A Simple Example

We present a detailed, simple example illustrating computational aspects of the returns-timing invention. In this example there will be three markets—Japan (JP), Germany (GM), and the United States (US)—and nine assets: three assets from Japan, labeled JP1, JP2, and JP3; three assets from Germany labeled GM1, GM2, and GM3; and three assets from the United States labeled US1, US2, and US3.

The example shows: how a simple, vector auto-regressive model of market returns may be computed; how the synchronized returns may be computed; how the synchronized returns may be used in a factor return regression; how the synchronized factor returns may be computed without computing synchronized asset returns; and how the specific returns of DRs may be altered to account for the difference in home and quotation markets.

Step 1: The Market VAR Model

Consider three markets: Japan (JP), Germany (GM), and the United States (US). We estimate a simple first-order, vector auto-regressive (VAR) model of the market returns:

$$R_t^M = NR_{t-1}^M + \epsilon_t^M, \tag{38}$$

where $$R_t^M = \begin{bmatrix} R_J^M \\ R_G^M \\ R_U^M \end{bmatrix} \text{ and } N = \begin{bmatrix} 0 & n_{JG} & n_{JU} \\ 0 & 0 & n_{GU} \\ 0 & 0 & 0 \end{bmatrix}. \tag{39}$$

The markets have been ordered from in temporal order, from the earliest to the latest, where we assume that the closing of the US market is the last market data available. We use a set of eight, daily market returns to estimate the three unknown coefficients: $n_{JG}$, $n_{JU}$, and $n_{GU}$.

For this example, the eight daily market returns used are:

$$\{R^M\} = \{ R_{t-7}^M \quad R_{t-6}^M \quad R_{t-5}^M \quad R_{t-4}^M \quad R_{t-3}^M \quad R_{t-2}^M \quad R_{t-1}^M \quad R_t^M \} \quad (40)$$

$$= \begin{bmatrix} 0.0107 & 0.0113 & -0.0170 & -0.0053 & -0.0090 & -0.0137 & 0.0056 & 0.0092 \\ -0.0028 & -0.0174 & -0.0116 & 0.0011 & -0.0129 & -0.0064 & 0.0030 & 0.0068 \\ 0.0019 & -0.0165 & -0.0032 & -0.0044 & -0.0147 & 0.0039 & -0.0075 & 0.0176 \end{bmatrix}$$

There are many ways to estimate the unknown coefficients. One can use ordinary least squares, weight least squares, robust least squares, etc. For this simple example, we use ordinary least squares, minimizing $$\sum_{i=0}^{6} (R_{t-i}^M - NR_{t-i-1}^M)^T (R_{t-i}^M - NR_{t-i-1}^M). \quad (41)$$

This gives the model $$N = \begin{bmatrix} 0 & 0.2879 & 0.6432 \\ 0 & 0 & 0.492 \\ 0 & 0 & 0 \end{bmatrix}. \quad (42)$$

In contrast to this simple example, the Axioma Research Global Model uses either 60 or 250 daily market returns instead of eight. The Axioma Research Global Model uses constrained regression to impose the requirement that all the non-zero coefficients of N are non-negative. The Axioma Research Global Model generally assumes that only the last column of N is non-zero; that is, the model only estimates correlations between non-US markets and the US market. In other words, $n_{JG}$ would typically be zero.

Step 2: Adjusted Returns for Equities

Having estimated N, we next adjust the observed asset returns using that model to create synchronized asset returns. We consider nine assets: three assets from Japan, labeled JP1, JP2, and JP3; three assets from Germany labeled GM1, GM2, and GM3; and three assets from the United States labeled US1, US2, and US3. At time t, the asset returns are $$r_1 = \begin{bmatrix} r_{JP1} \\ r_{JP2} \\ r_{JP3} \\ r_{GM1} \\ r_{GM2} \\ r_{GM3} \\ r_{US1} \\ r_{US2} \\ r_{US3} \end{bmatrix} = \begin{bmatrix} 0.0028 \\ 0.0012 \\ 0.0176 \\ 0.0117 \\ -0.0074 \\ 0.0019 \\ 0.0287 \\ 0.0188 \\ 0.0442 \end{bmatrix} \quad (43)$$

We assume that each asset return may be written as the sum of the return to the asset's local market (the market on which the asset trades) and a remainder, non-market term:

$$r_t = r_t^M + \gamma_t, \quad (44)$$

$$r_t^M = \begin{bmatrix} 0.0092 \\ 0.0092 \\ 0.0092 \\ 0.0068 \\ 0.0068 \\ 0.0068 \\ 0.0176 \\ 0.0176 \\ 0.0176 \end{bmatrix}$$

$$\gamma_t = r_t - r_t^M = \begin{bmatrix} -0.0064 \\ -0.0080 \\ 0.0084 \\ 0.0049 \\ -0.0142 \\ -0.0049 \\ 0.0111 \\ 0.0012 \\ 0.0266 \end{bmatrix},$$

where we have used the market returns of the previous section ($R_t^M$, last column of $\{R^M\}$)

We use the coefficient matrix N from the previous section to estimate a set of forecast or synchronized market returns for each asset. These synchronized market returns correct each market's observed, closing return. For each Japanese asset, the forecasted market return is $\hat{r}_t^{JP} = n_{JG} r_t^{GM} + n_{JU} r_t^{US}$; for each German asset, the forecasted market return is $\hat{r}_t^{GM} = n_{GU} r_t^{US}$; and for each US asset, the forecasted market return is zero. This gives $$\hat{r}_t^M = \begin{bmatrix} 0.0129 \\ 0.0129 \\ 0.0129 \\ 0.0054 \\ 0.0054 \\ 0.0054 \\ 0 \\ 0 \\ 0 \end{bmatrix} \quad (45)$$

When then have the adjusted, synchronized asset returns $$\hat{r}_t = \hat{r}_t^M + \gamma_t = \begin{bmatrix} 0.0069 \\ 0.0053 \\ 0.0217 \\ 0.0128 \\ -0.0063 \\ 0.0030 \\ 0.0111 \\ 0.0012 \\ 0.0266 \end{bmatrix}, \quad (46)$$

Step 3: Factor-Returns for Using Unadjusted and Adjusted Asset Returns

The factor return model for a factor risk model is $$r_t = Bf_t + u_t. \quad (47)$$

where $r_t$ is a vector of equity returns, B is a matrix of factor exposures, $f_t$ is a vector of factor returns, and $u_t$ is a vector of asset specific (idiosyncratic) returns. For this simple example, the factors include a market factor (column 1), two style factors (columns 2 and 3), and three country factors (columns 4, 5, and 6, denoting JP, GM, and US respectively). At time t, we have $$B_t = \begin{bmatrix} 1 & -0.6041 & 0.9975 & 1 & 0 & 0 \\ 1 & -0.3990 & -0.1589 & 1 & 0 & 0 \\ 1 & 0.5201 & 0.7558 & 1 & 0 & 0 \\ 1 & -0.4076 & -0.4012 & 0 & 1 & 0 \\ 1 & -0.1105 & 0.4041 & 0 & 1 & 0 \\ 1 & 0.4140 & -0.5086 & 0 & 1 & 0 \\ 1 & -0.4831 & -0.6413 & 0 & 0 & 1 \\ 1 & 0.0673 & -0.1713 & 0 & 0 & 1 \\ 1 & 0.4689 & -0.1693 & 0 & 0 & 1 \end{bmatrix} \quad (48)$$

In this simple example, the country exposure are binary (i.e., all country exposures are either zero or one). The returns-timing invention will work with non-binary country exposures as well. We wish to estimate $f_t$:

$$f_t = \begin{bmatrix} f_{Market} \\ f_{Style1} \\ f_{Style2} \\ f_{JP} \\ f_{GM} \\ f_{US} \end{bmatrix}. \quad (49)$$

There are many ways to estimate the unknown factor returns. Axioma typically uses constrained, robust regression techniques with different weights for each asset. The constraint is necessary since the first column of B is a linear combination of the last three columns, e.g., $$B_{i1} = B_{i4} + B_{i5} + B_{i6}, \text{ for every } i. \quad (50)$$

Linear dependence such as this is frequently encountered when factor models include market, industry, country, and currency factors. For this simple example, we impose the constraint that the sum of the three country factor returns is zero. That is $$f_{JP} + f_{GM} + f_{US} = 0 \quad (51)$$

For this simple example, we estimate the unknown factor returns using constrained, ordinary least squares regression. That is, we minimize $$(r_t - Bf_t)^T (r_t - Bf_t). \quad (52)$$

subject to the constraint (51). The solution for $f_t$ is:

$$f_t = \begin{bmatrix} 0.0140 \\ 0.0086 \\ 0.0031 \\ -0.0071 \\ -0.0103 \\ 0.0174 \end{bmatrix}. \quad (53)$$

However, $r_t$ has not been corrected for different market closing times, i.e., synchronized. Rather than use the observed returns as of each markets close, $r_t$, we can instead estimate the factor returns using the adjusted asset returns, $\hat{r}_t$, constructed in the previous section:

$$\hat{r}_t = B\hat{f}_t + \hat{u}_t \quad (54)$$

together with the constraint $$\hat{f}_{JP} + \hat{f}_{GM} + \hat{f}_{US} = 0 \quad (55)$$

The constrained ordinary least squares solution to this problem is $$\hat{f}_t = \begin{bmatrix} 0.0099 \\ 0.0086 \\ 0.0031 \\ 0.0011 \\ -0.0051 \\ 0.0039 \end{bmatrix}. \quad (56)$$

Factor risk models constructed using $\hat{f}_t$ have better risk predictions than those constructed using $f_t$ due to the synchronization correction for market closings.

Step 4: Efficient Estimation of $\hat{f}_t$

One of the drawbacks of the method proposed in the previous section is that, even though there are only three markets, nine new synchronized asset returns must be computed in order to compute synchronized the factor returns. This situation is even more onerous in practice: whereas a global risk model may include ten or so important markets, it may model tens of thousands of individual assets. Using the methodology described in the previous section, a set of synchronized returns must be computed for each risk model and for each individual asset. For a global (WW), European (EU), and Emerging Markets (EM) set of models, four separate set of asset returns are required: $r_t$, $\hat{r}_t^{WW}$, $\hat{r}_t^{EU}$, and $\hat{r}_t^{EM}$. Constructing, saving, and properly managing such data is cumbersome.

Furthermore, clients may desire both the adjusted and unadjusted results. For example, clients may desire factor-factor covariance estimates created using synchronized factor returns and performance attribution using raw factor returns.

In this section, we detail an important modeling improvement, as it allows the multi-factor risk model to be computed without explicitly solving for or storing the synchronized returns, $\hat{r}_t$. It also allows one to easily convert raw and synchronized factor returns.

The returns-timing adjustment factor, $\Delta_t$, is the difference in the synchronized (forecast) and observed asset returns.

$$\Delta_t = \hat{r}_t - r_t = \begin{bmatrix} 0.0041 \\ 0.0041 \\ 0.0041 \\ 0.0011 \\ 0.0011 \\ 0.0011 \\ -0.0176 \\ -0.0176 \\ -0.0176 \end{bmatrix}, \quad (57)$$

Note that $\Delta_t$ is the same for all assets from the same country and is the negative of the market return for the US assets. In fact, letting $$d = \begin{bmatrix} d_J \\ d_G \\ d_U \end{bmatrix} = (N-I)R_t^M = \begin{bmatrix} -1 & n_{JG} & n_{JU} \\ 0 & -1 & n_{GU} \\ 0 & 0 & -1 \end{bmatrix} R_t^M = \begin{bmatrix} 0.0041 \\ 0.0011 \\ -0.0176 \end{bmatrix}. \quad (58)$$

Then $$\Delta_{t_i} = Cd = \begin{bmatrix} 1 & 0 & 0 \\ 1 & 0 & 0 \\ 1 & 0 & 0 \\ 0 & 1 & 0 \\ 0 & 1 & 0 \\ 0 & 1 & 0 \\ 0 & 0 & 1 \\ 0 & 0 & 1 \\ 0 & 0 & 1 \end{bmatrix} d \quad (59)$$

Notice that the matrix C is identical to that part of B comprising just the country factors. Hence, estimating $$\hat{r}_t = r_t + \Delta_t = B\hat{f}_t + \hat{u}_t \quad (60)$$

subject to the constraint $$\hat{f}_{JP} + \hat{f}_{GM} + \hat{f}_{US} = 0 \quad (61)$$

can be rewritten as $$r_t + Cd = B\hat{f}_t + \hat{u}_t \quad (62)$$

If we define $$\hat{f}_t = \begin{bmatrix} \hat{f}_{Market} + c \\ \hat{f}_{Style1} \\ \hat{f}_{Style2} \\ \hat{f}_{JP} - d_J - c \\ \hat{f}_{GM} - d_G - c \\ \hat{f}_{US} - d_U - c \end{bmatrix}. \quad (63)$$

where c is an unspecified constant, we can estimate $\tilde{f}_t$ from $$r_t = B\tilde{f}_t + \hat{u}_t \quad (64)$$

subject to the constraint $$\tilde{f}_{JP} + \tilde{f}_{GM} + \tilde{f}_{US} = d_J + d_G + d_U + 3c \quad (65)$$

We can then construct $\hat{f}_t$ from $\tilde{f}_t$ up to the constant c. The ordinary least squares solution is unaffected by the choice of c, so we may set it arbitrarily (say, c=0) and obtain a consistent, valid solution for $\hat{f}_t$. If c is set to $-(d_J + d_G + d_U)/3$, then both the adjusted and unadjusted factor returns satisfy the constraint that the sum of the country factor returns is zero.

Step 5: Specific Return Correction for DRs

With depository receipts (DRs), the asset is traded on one exchange (the country or currency of quotation) but is comprised of one or more assets that from another exchange (the home country or currency). In factor risk models, the DR only has exposure to the home country, not the exchange on which it is traded and quoted. As a result, the observed return for the DR, $r_t$, is not the true return, owing to the difference in returns between the home and quotation markets.

This issue can be remedied by altering the residual return obtained in by the factor return regression using the formula $$\hat{u}_{true} = \hat{u}_{regression} - d_H + d_Q \quad (66)$$

where $\hat{u}_{true}$ is the true specific return, $\hat{u}_{regression} = r_t - B\hat{f}$ is the specific return obtained from the return on the exchange of quotation minus the synchronized factor regression results, $d_H$ is the market return of the home country or currency, and $d_Q$ is the market return of the quotation market.

For example, suppose the last US asset from the previous example was a US traded ADR which modeling a set of Japanese holdings. In this case, the market of quotation is the US, but the home market is Japan. Then, we would obtain $\hat{u}_{regression} = r_t - B\hat{f}$ from the regression results and $$\hat{u}_{true} = \hat{u}_{regression} - d_J + d_U \quad (67)$$

This, in effect, makes the DR return decomposition truly local.

While the present invention has been disclosed in the context of various aspects of presently preferred embodiments, it will be recognized that the invention may be suitably applied to other environments consistent with the claims which follow.

We claim:

1. A computer-implemented method of computing a factor risk model, comprising a matrix of factor exposures, a matrix of factor-factor covariances, and a matrix of specific covariances, whose assets or underlying assets are traded in more than one market whose hours of trading are not the same, comprising:

storing data for the markets and assets included in the factor risk model in a memory;

selecting a single synchronization market from the more than one market utilizing a data entry device;

computing daily asset returns for all assets included in the factor risk model for each market on which the assets trade utilizing a programmed processor cooperating with memory;

estimating a correction matrix based on a regression of daily market returns for each market and daily market returns for the single synchronization market that synchronizes the daily asset returns to the synchronization market utilizing the programmed processor cooperating with memory;

computing a synchronized factor-factor covariance matrix utilizing the daily asset returns and the correction matrix utilizing the programmed processor cooperating with memory, where the correction matrix adjusts daily asset returns for markets whose hours of trading are not the same as the synchronization market;

computing the factor risk model, the matrix of factor exposures and the matrix of specific covariances using the daily asset returns and the correction matrix utilizing the programmed processor cooperating with memory; and outputting the factor risk model with the synchronized factor-factor covariance matrix, the matrix of factor exposures, and the matrix of specific covariances utilizing an output device.

2. The method of claim 1 where the output factor risk model is used to compute the volatility of a portfolio of assets.

3. The method of claim 1 where the output factor risk model is used to rebalance an investment portfolio.

4. The method of claim 1 where performance attribution is computed using the factor risk model.

5. The method of claim 1 where the correction matrix adjusts market returns for markets that trade earlier than the risk model synchronization market using the market return of the risk model synchronization market.

6. The method of claim 5 where the output factor risk model is used to compute the volatility of a portfolio of assets.

7. A computer-implemented method of computing a factor risk model, comprising a matrix of factor exposures, a matrix of factor-factor covariances, and a matrix of specific covariances, which contains depository receipts whose underlying assets are traded in a first market whose hours of trading are not the same hours as a second market on which the depository receipts trade, comprising:
    storing data for the markets, depository receipts, and assets included in the factor risk model in a memory;
    selecting a single synchronization market utilizing a data entry device;
    computing daily asset returns for all assets and depository receipts included in the factor risk model for each market on which the assets or depository receipts trade utilizing a programmed processor cooperating with memory;
    estimating a correction matrix based on a regression of daily market returns for each market and daily market returns for the single synchronization market that synchronizes the daily asset and depository receipt returns to the synchronization market utilizing a programmed processor cooperating with memory;
    computing synchronized specific returns for depository receipts utilizing the daily asset returns and the correction matrix utilizing a programmed processor cooperating with memory, where the correction matrix adjusts daily asset returns for markets whose hours of trading are not the same as the synchronization market;
    computing synchronized specific covariances of the depository receipts using the synchronized specific returns utilizing a programmed processor cooperating with memory;
    computing the factor risk model, the matrix of factor exposures, and the matrix of specific factor-factor covariances using the daily asset returns and the correction matrix utilizing a programmed processor cooperating with memory; and
    outputting the factor risk model, the matrix of factor exposures, and the matrix of specific factor-factor covariances utilizing an output device.

8. The method of claim 7 where the output factor risk model is used to compute the volatility of a portfolio of assets that includes depository receipts.

9. The method of claim 7 where the output factor risk model is used to rebalance an investment portfolio that includes depository receipts.

10. The method of claim 7 where performance attribution is computed using the factor risk model.

11. The method of claim 7 where the correction matrix adjusts market returns for markets that trade earlier than the risk model synchronization market using the market return of the synchronization market.

12. The method of claim 11 where the output factor risk model is used to compute the volatility of a portfolio of assets that may include depository receipts.

13. A computer based apparatus for computing a factor risk model, comprising a matrix of factor exposures, a matrix of factor-factor covariances, and a matrix of specific covariances, whose assets or underlying assets are traded in more than one market whose hours of trading are not the same, comprising:
    a memory storing data for the markets, assets and underlying assets included in the factor risk model;
    a data entry device for selecting a single synchronization market;
    a programmed processor:
        computing daily asset returns for all assets included in the factor risk model for each market on which the assets trade utilizing a programmed processor cooperating with memory;
        estimating a correction matrix based on a regression of daily market returns for each market and daily market returns for the single synchronization market that synchronizes daily asset returns to the synchronization market utilizing the programmed processor cooperating with memory;
        computing a synchronized factor-factor covariance matrix utilizing the daily asset returns and the correction matrix utilizing the programmed processor cooperating with memory, where the correction matrix adjusts asset returns for markets whose hours of trading are not the same as the synchronization market; and
        computing the factor risk model, the matrix of factor exposures and the matrix of specific covariances using the daily asset returns and the correction matrix utilizing the programmed processor cooperating with memory; and
    an output device driven by the programmed processor to output the factor risk model, the matrix of factor exposures, and the matrix of specific covariances.

14. The apparatus of claim 13 where the output factor risk model is used as an input for the programmed processor to rebalance an investment portfolio; and
    the output device is driven by the programmed processor cooperating with memory to output the rebalanced investment portfolio.

15. The apparatus of claim 13 where the correction matrix adjusts market returns for markets that trade earlier than the risk model synchronization market using the market return of the risk model synchronization market; and
    a display displays said adjustments.

16. A computer based apparatus for computing a factor risk model, comprising a matrix of factor exposures, a matrix of factor-factor covariances, and a matrix of specific covariances, that contains depository receipts whose underlying assets are traded in a market whose hours of trading are not the same as the hours of trading of the market of the depository receipts, comprising;
    a data entry device to select a single synchronization market;
    a programmed processor cooperating with memory to:
        compute daily asset returns for all assets and depository receipts included in the factor risk model for each market on which the assets or depository receipts trade;
        estimate a correction matrix based on a regression of daily market returns for each market and daily market returns for the single synchronization market that synchronizes the daily asset and depository receipt returns to the synchronization market;

compute a synchronized specific return of the depository receipt utilizing the daily depository receipt returns and the correction matrix;

compute synchronized specific covariance of the depository receipt; and compute of the factor risk model, the matrix of factor exposures and the matrix of factor-factor covariances using the daily asset returns and the correction matrix; and an output device to output the factor risk model, the matrix of factor exposures and the matrix of factor-factor covariances.

17. The apparatus of claim 16 where the output factor risk model is used by the programmed processor to compute the volatility of a portfolio of assets that include depository receipts; and the output device outputs a representation of the volatility.

18. The apparatus of claim 16 where the output factor risk model is used by the programmed processor to rebalance an investment portfolio that may include depository receipts; and the output device outputs the rebalanced investment portfolio.

* * * * *